(12) United States Patent
Sugimoto et al.

(10) Patent No.: US 10,972,751 B2
(45) Date of Patent: Apr. 6, 2021

(54) VIDEO ENCODING APPARATUS AND METHOD, AND VIDEO DECODING APPARATUS AND METHOD

(71) Applicant: NIPPON TELEGRAPH AND TELEPHONE CORPORATION, Tokyo (JP)

(72) Inventors: Shiori Sugimoto, Yokosuka (JP); Shinya Shimizu, Yokosuka (JP); Akira Kojima, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 240 days.

(21) Appl. No.: 14/913,482

(22) PCT Filed: Oct. 10, 2014

(86) PCT No.: PCT/JP2014/077210
§ 371 (c)(1),
(2) Date: Feb. 22, 2016

(87) PCT Pub. No.: WO2015/056647
PCT Pub. Date: Apr. 23, 2015

(65) Prior Publication Data
US 2016/0227246 A1 Aug. 4, 2016

(30) Foreign Application Priority Data
Oct. 17, 2013 (JP) .................................. 2013-216488

(51) Int. Cl.
*H04N 19/597* (2014.01)
*H04N 19/139* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC .. H04N 19/105; H04N 19/139; H04N 19/176; H04N 19/44; H04N 19/55; H04N 19/577; H04N 19/597
(Continued)

(56) References Cited

U.S. PATENT DOCUMENTS

2010/0008422 A1* 1/2010 Shimizu ............... H04N 19/597
375/240.16
2013/0308706 A1* 11/2013 Sugio ................... H04N 19/513
375/240.16
(Continued)

FOREIGN PATENT DOCUMENTS

EP 02566167 A1 3/2013
KR 10-2013-0023444 A 3/2013
(Continued)

OTHER PUBLICATIONS

M. Flierl and B. Girod, "Multiview video compression", Signal Processing Magazine, IEEE, pp. 66-76, Nov. 2007.
(Continued)

*Primary Examiner* — Jamie J Atala
*Assistant Examiner* — Kathleen V Nguyen
(74) *Attorney, Agent, or Firm* — Harness, Dickey & Pierce, P.L.C.

(57) ABSTRACT

A video encoding apparatus that predictive-encodes an encoding target image included in an encoding target video. The apparatus includes a prediction device that predicts the encoding target image with reference to a previously-encoded picture as a reference picture and determines first reference information which indicates a first reference
(Continued)

region as a reference destination; a second reference information determination device that determines, from reference information used when the first reference region was predictive-encoded, second reference information which indicates a second reference region as another reference destination for the encoding target image; and a predicted image generation device that generates a predicted image based on the second reference information, or both the first reference information and the second reference information.

15 Claims, 16 Drawing Sheets

(51) Int. Cl.
  *H04N 19/105*  (2014.01)
  *H04N 19/176*  (2014.01)
  *H04N 19/44*  (2014.01)
  *H04N 19/55*  (2014.01)
  *H04N 19/577*  (2014.01)

(52) U.S. Cl.
  CPC ........... *H04N 19/176* (2014.11); *H04N 19/44* (2014.11); *H04N 19/55* (2014.11); *H04N 19/577* (2014.11)

(58) Field of Classification Search
  USPC .................................................. 375/240.16
  See application file for complete search history.

(56) References Cited

U.S. PATENT DOCUMENTS

2014/0161189 A1* 6/2014 Zhang ................. H04N 19/597
                           375/240.16

2015/0326881 A1* 11/2015 Ikai ...................... H04N 19/117
                           375/240.12

FOREIGN PATENT DOCUMENTS

| WO | WO-2008053758 A1 | 5/2008 |
| WO | WO-2012108315 A1 | 8/2012 |
| WO | WO-2013001749 A1 | 1/2013 |
| WO | WO-2013001813 A1 | 1/2013 |

OTHER PUBLICATIONS

Yang, H., Chang, Y., & Huo, J., "Fine-Granular Motion Matching for Inter-View Motion Skip Mode in Multiview Video Coding", IEEE Transactions on Circuits and Systems for Video Technology, vol. 19, No. 6, pp. 887-892, Jun. 2009.

X. Wang and J. Ridge, "Improved video coding with residual prediction for extended spatial scalability", ISCCSP 2008, pp. 1041-1046, Mar. 2008.

Shin'ya Shimizu, "Depth Map o Mochiita Sanjigen Eizo Fugoka no Kokusai Hyojunka Doko", IPSJ SIG Notes, Audio Visual and Multimedia Information Processing (AVM), Information Processing Society of Japan, Sep. 5, 2013 (Sep. 5, 2013), vol. 2013-AVM-82, No. 11, pp. 1 to 6.

International Search Report for PCT/JP2014/077210, ISA/JP, dated Jan. 13, 2015.

Notice of Allowance for parallel application KR 10-2016-7006827, dated Sep. 6, 2017, with English translation attached.

* cited by examiner

VIDEO ENCODING APPARATUS AND METHOD, AND VIDEO DECODING APPARATUS AND METHOD

CROSS-REFERENCE TO RELATED APPLICATIONS

This application is a 371 U.S. National Stage of International Application No. PCT/JP2014/077210, filed Oct. 10, 2014. Priority is claimed on Japanese Patent Application No. 2013-216488, filed Oct. 17, 2013. The contents of the above applications are incorporated herein by reference.

TECHNICAL FIELD

The present invention relates to a video encoding apparatus, a video decoding apparatus, a video encoding method, and a video decoding method.

BACKGROUND ART

In general video encoding, spatial and temporal continuity of each object is utilized to divide each video frame into blocks as units to be processed. A video signal of each block is spatially or temporally predicted, and prediction information, that indicates utilized prediction method, and a prediction residual are encoded, which considerably improves the encoding efficiency in comparison with a case of encoding the video signal itself. In addition, conventional two-dimensional video encoding performs intra prediction that predicts an encoding target signal with reference to previously-encoded blocks in the current frame; and inter-frame prediction that predicts the encoding target signal based on motion compensation or the like with reference to a previously-encoded frame.

Below, multi-view video encoding will be explained. The multi-view video encoding encodes a plurality of videos, which were obtained by photographing the same scene by a plurality of cameras, with high encoding efficiency by utilizing the redundancy between the videos. Non-Patent Document 1 explains the multi-view video encoding in detail.

In addition to the prediction method used in general video encoding, the multi-view video encoding utilizes (i) inter-view (or inter-viewpoint) prediction that predicts an encoding target signal based on disparity compensation with reference to a previously-encoded video from another viewpoint, (ii) inter-view residual prediction that predicts an encoding target signal by means of inter-frame prediction and predicts a residual signal for the above prediction with reference to a residual signal at the time of encoding of a previously-encoded video from another viewpoint. In the multi-view video encoding as MVC (Multiview Video Coding), the inter-view prediction is treated as inter prediction together with inter-frame prediction, where for B-pictures, bidirectional prediction which employs interpolation utilizing two or more predicted images may be performed to produce a predicted image. As described above, in the multi-view video encoding, the bidirectional prediction utilizing both the inter-frame prediction and the inter-view prediction is applied to pictures to which the both predictions can be applied.

When the inter-frame prediction is performed, it is necessary to obtain reference information such as a reference picture index or a motion vector which indicates a reference (destination). Generally, the reference information is encoded as prediction information and is multiplexed with corresponding video. In order to reduce the amount of code for the relevant information, the reference information may be predicted by using a certain method.

In a direct mode as a generally known method, previously-encoded prediction information, which was used when encoding a peripheral block of the encoding target image, is obtained and determined to be reference information utilized in the prediction of the encoding target image. In a merge mode as another known method, prediction information items of peripheral blocks are listed as a candidate list, and an identifier utilized to identify a target block, for which the prediction information is retrieved from the list, is encoded.

In addition to such a method to determine the predicted value for the reference information, motion vector prediction or the like is known as a method to encoded a difference between the predicted value and actual reference information and multiplex the difference together with the relevant video.

Additionally, the multi-view video encoding has a method known as inter-view motion prediction in which the encoding target image and a region (which corresponds to the encoding target image) on a picture from another viewpoint use common reference information. Non-Patent Document 2 describes the multi-view video encoding in detail.

Residual prediction is another known method. This method reduces the amount of code for the prediction residual by utilizing a phenomenon that when two images which correlate closely with each other are individually subjected to predictive encoding, their prediction residuals also correlate closely with each other. Non-Patent Document 3 describes the multi-view video encoding in detail.

In the inter-view residual prediction employed in the multi-view video encoding, for a region that corresponds to the encoding target image and belongs to video from another viewpoint, a prediction residual signal obtained when encoding this region is subtracted from a prediction residual signal of the encoding target, so as to reduce the energy of the residual signal and improve the encoding efficiency.

In an example method for obtaining the corresponding relationship between different viewpoints, if a previously-encoded peripheral block was encoded by disparity compensation prediction, a disparity vector therefore is utilized to determine a region from another viewpoint, which corresponds to the encoding target block. The disparity vector obtained in this method is called a "neighboring block based disparity vector (NBDV)".

When the inter-frame prediction is applied to B-pictures, the inter-view residual prediction is used as a separate method for residuals.

In the present specification "image" denotes one frame or static image of video (moving image), and thus "video" is a set of a plurality of frames (images).

PRIOR ART DOCUMENT

Non-Patent Document

Non-Patent Document 1: M. Flierl and B. Girod, "Multiview video compression", Signal Processing Magazine, IEEE, pp. 66-76, November 2007.

Non-Patent Document 2: Yang, H., Chang, Y., & Huo, J., "Fine-Granular Motion Matching for Inter-View Motion Skip Mode in Multiview Video Coding", IEEE Transactions on Circuits and Systems for Video Technology, Vol. 19, No. 6, pp. 887-892, June 2009.

Non-Patent Document 3: X. Wang and J. Ridge, "Improved video coding with residual prediction for extended spatial scalability", ISCCSP 2008, pp. 1041-1046, March 2008.

DISCLOSURE OF INVENTION

Problem to be Solved by the Invention

In the multi-view video encoding, the inter-view motion prediction is an effective code amount reduction method. However, if vector sharing between viewpoints cannot be implemented due to a problem in camera arrangement or the like, such an effect cannot be acquired.

Additionally, in the inter-view motion prediction or the residual prediction, generally, the NBDV is utilized to determine a region from another viewpoint, the region corresponding to the encoding target image. Such a method is effective if the encoding target image has a motion or disparity equivalent to that of a relevant peripheral block, otherwise no effect is obtained. In addition, this method cannot be used when there is no peripheral block which has been encoded by the disparity compensation prediction.

In order to perform the inter-view motion prediction or the residual prediction under such a troublesome condition, information (e.g., additional disparity vector) for obtaining inter-view correspondence is required, which increases the relevant amount of code.

In light of the above circumstances, an object of the present invention is to provide a video encoding apparatus, a video decoding apparatus, a video encoding method, and a video decoding method, by which the amount of code required for encoding the prediction residual can be reduced by improving the accuracy of the predicted image.

Means for Solving the Problem

The present invention provides a video encoding apparatus that predictive-encodes an encoding target image included in an encoding target video, the apparatus comprising:
 a prediction device that predicts the encoding target image with reference to a previously-encoded picture as a reference picture and determines first reference information which indicates a first reference region as a reference destination;
 a second reference information determination device that determines, from reference information used when the first reference region was predictive-encoded, second reference information which indicates a second reference region as another reference destination for the encoding target image; and
 a predicted image generation device that generates a predicted image based on the second reference information, or both the first reference information and the second reference information.

In a typical example, any one of the first reference information and the second reference information indicates a reference region on a reference picture in a time direction, this picture being an image obtained at a time which differs from a time at which the encoding target image was obtained, and the other indicates a reference region on a reference picture in a disparity direction, this picture being an image from a viewpoint which differs from that of the encoding target image.

In a preferable example, the predicted image generation device generates the predicted image by generating a first primary predicted image by using the first reference information, generating a second primary predicted image by using the second reference information, and mixing the first primary predicted image and the second primary predicted image with each other.

In another preferable example, the predicted image generation device generates the predicted image by generating a first primary predicted image by using the first reference information, generating a second primary predicted image by using the second reference information, and performing residual prediction by using the first reference information and prediction information used when the first reference region was encoded or by using the first reference information and the second reference information.

In this case, the predicted image generation device may generate the predicted image by generating a secondary predicted image based on a third reference region as a reference destination for prediction of the first reference region, and performing the residual prediction by using the first primary predicted image, the second primary predicted image, and the secondary predicted image.

In another preferable example, the second reference information determination device determines the second reference information by using information which is obtained by correcting the reference information used when the first reference region was predictive-encoded.

In another typical example, the reference information used when the first reference region was predictive-encoded is a motion vector or a disparity vector.

The present invention also provides a video encoding apparatus that predictive-encodes an encoding target image included in an encoding target video, the apparatus comprising:
 a prediction device that predicts the encoding target image with reference to a previously-encoded picture as a reference picture and determines first reference information which indicates a first reference region as a reference destination;
 a second reference information determination device that determines, from reference information used when the first reference region was predictive-encoded, second reference information which indicates a second reference region as another reference destination for the encoding target image; and
 a candidate list updating device that adds the second reference information to a candidate list in which prediction information items for peripheral images of the encoding target image are listed.

The present invention also provides a video decoding apparatus that predictive-decodes a decoding target image included in a decoding target video, the apparatus comprising:
 a second reference information determination device, wherein from reference information used when a first reference region was predictive-decoded where the first reference region is a reference destination indicated by first reference information obtained based on encoded prediction information or information which is available in the video decoding apparatus, the second reference information determination device determines second reference information which indicates a second reference region as another reference destination for the decoding target image;
 a predicted image generation device that generates a predicted image based on the second reference information, or both the first reference information and the second reference information.

In a typical example, any one of the first reference information and the second reference information indicates a reference region on a reference picture in a time direction, this picture being an image obtained at a time which differs from a time at which the decoding target image was obtained, and the other indicates a reference region on a reference picture in a disparity direction, this picture being an image from a viewpoint which differs from that of the decoding target image.

In a preferable example, the predicted image generation device generates the predicted image by generating a first primary predicted image by using the first reference information, generating a second primary predicted image by using the second reference information, and mixing the first primary predicted image and the second primary predicted image with each other.

In another preferable example, the predicted image generation device generates the predicted image by generating a first primary predicted image by using the first reference information, generating a second primary predicted image by using the second reference information, and performing residual prediction by using the first reference information and prediction information used when the first reference region was decoded or by using the first reference information and the second reference information.

In this case, the predicted image generation device may generate the predicted image by generating a secondary predicted image based on a third reference region as a reference destination for prediction of the first reference region, and performing the residual prediction by using the first primary predicted image, the second primary predicted image, and the secondary predicted image.

In another preferable example, the second reference information determination device determines the second reference information by using information which is obtained by correcting the reference information used when the first reference region was predictive-decoded.

In another typical example, the reference information used when the first reference region was predictive-decoded is a motion vector or a disparity vector.

The present invention also provides a video decoding apparatus that predictive-decodes a decoding target image included in a decoding target video, the apparatus comprising:

a prediction device that predicts the decoding target image with reference to a previously-decoded picture as a reference picture and determines first reference information which indicates a first reference region as a reference destination;

a second reference information determination device that determines, from reference information used when the first reference region was predictive-decoded, second reference information which indicates a second reference region as another reference destination for the decoding target image; and a candidate list updating device that adds the second reference information to a candidate list in which prediction information items for peripheral images of the decoding target image are listed.

The present invention also provides a video encoding method executed by a video encoding apparatus that predictive-encodes an encoding target image included in an encoding target video, the method comprising:

a prediction step that predicts the encoding target image with reference to a previously-encoded picture as a reference picture and determines first reference information which indicates a first reference region as a reference destination;

a second reference information determination step that determines, from reference information used when the first reference region was predictive-encoded, second reference information which indicates a second reference region as another reference destination for the encoding target image; and a predicted image generation step that generates a predicted image based on the second reference information, or both the first reference information and the second reference information.

The present invention also provides a video encoding method executed by a video encoding apparatus that predictive-encodes an encoding target image included in an encoding target video, the method comprising:

a prediction step that predicts the encoding target image with reference to a previously-encoded picture as a reference picture and determines first reference information which indicates a first reference region as a reference destination;

a second reference information determination step that determines, from reference information used when the first reference region was predictive-encoded, second reference information which indicates a second reference region as another reference destination for the encoding target image; and a candidate list updating step that adds the second reference information to a candidate list in which prediction information items for peripheral images of the encoding target image are listed.

The present invention also provides a video decoding method executed by a video decoding apparatus that predictive-decodes a decoding target image included in a decoding target video, the method comprising:

a second reference information determination step, wherein from reference information used when a first reference region was predictive-decoded where the first reference region is a reference destination indicated by first reference information obtained based on encoded prediction information or any information which is available in the video decoding apparatus, the second reference information determination step determines second reference information which indicates a second reference region as another reference destination for the decoding target image;

a predicted image generation step that generates a predicted image based on the second reference information, or both the first reference information and the second reference information.

The present invention also provides a video decoding method executed by a video decoding apparatus that predictive-decodes a decoding target image included in a decoding target video, the method comprising:

a prediction step that predicts the decoding target image with reference to a previously-decoded picture as a reference picture and determines first reference information which indicates a first reference region as a reference destination;

a second reference information determination step that determines, from reference information used when the first reference region was predictive-decoded, second reference information which indicates a second reference region as another reference destination for the decoding target image; and a candidate list updating step that adds the second reference information to a candidate list in which prediction information items for peripheral images of the decoding target image are listed.

Effect of the Invention

According to the present invention, the accuracy of the predicted image can be improved, and thus it is possible to reduce the amount of code required for prediction residual encoding.

MODE FOR CARRYING OUT THE INVENTION

Below, embodiments of the present invention will be explained with reference to the drawings.

First Embodiment

Figure 1:
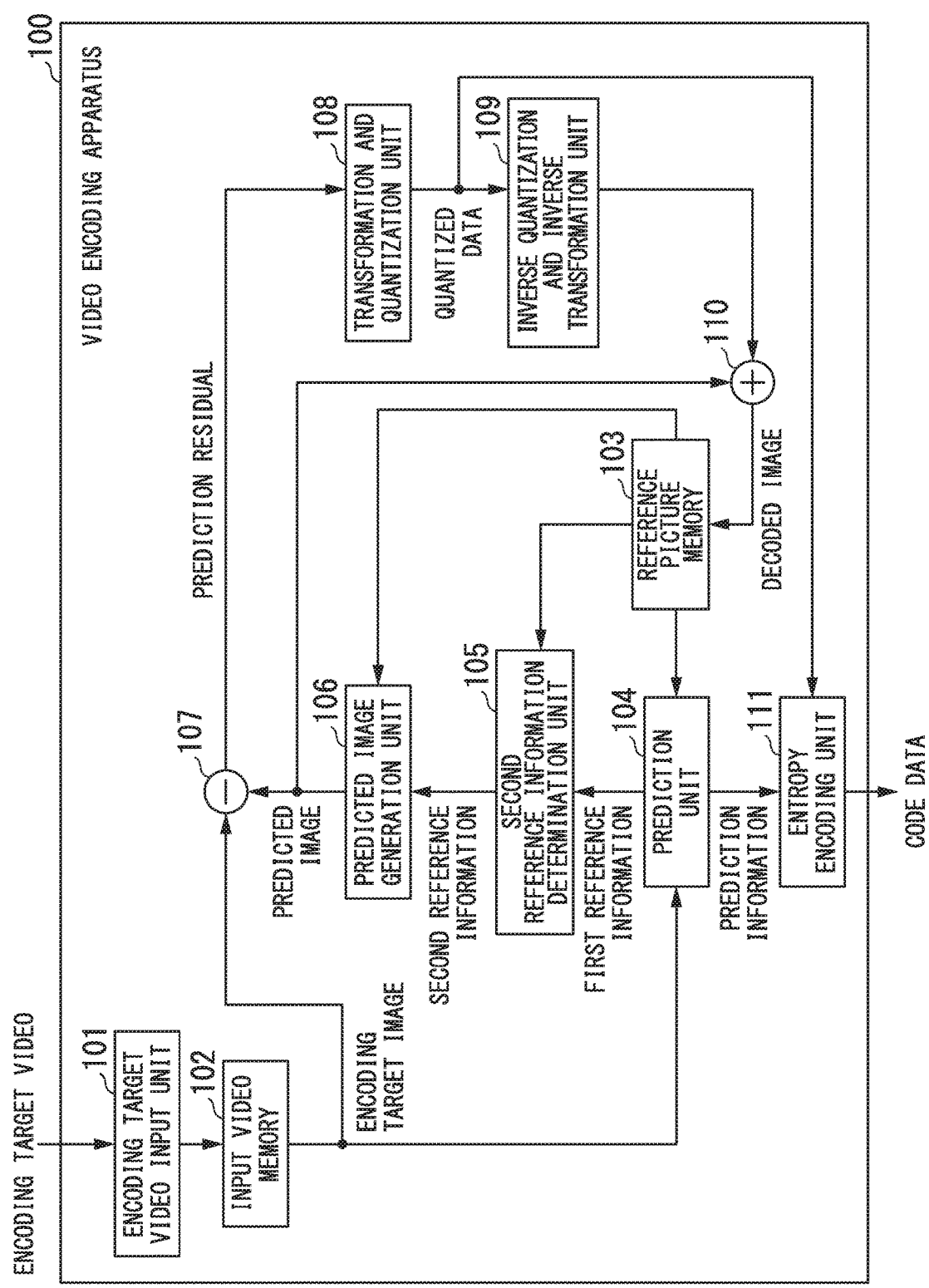
FIG. 1 is a block diagram that shows the structure of a video encoding apparatus 100 according to a first embodiment of the present invention.

In the beginning, a first embodiment will be explained. FIG. 1 is a block diagram that shows the structure of a video encoding apparatus 100 according to the first embodiment of the present invention.

As shown in FIG. 1, the video encoding apparatus 100 has an encoding target video input unit 101, an input video memory 102, a reference picture memory 103, a prediction unit 104, a second reference information determination unit 105, a predicted image generation unit 106, a subtraction unit 107, a transformation and quantization unit 108, an inverse quantization and inverse transformation unit 109, an addition unit 110, and an entropy encoding unit 111.

The encoding target video input unit 101 is utilized to input a video (image) as an encoding target into the video encoding apparatus 100. Below, this video as an encoding target is called an "encoding target video". In particular, a frame to be processed is called an "encoding target frame" or an "encoding target picture".

The input video memory 102 stores the input encoding target video.

The reference picture memory 103 stores images that have been encoded and decoded. Below, each frame stored in the memory 103 is called an "encoding target video". In particular, a frame to be processed is called a "reference frame" or a "reference picture".

The prediction unit 104 subjects the encoding target image to prediction by utilizing a reference picture stored in the reference picture memory 103, determines first reference information which indicates a first reference region as a reference (destination), and generates prediction information which is the first reference information or information by which the first reference information can be identified.

The second reference information determination unit 105 determines second reference information which indicates a second reference region as another reference (destination), from prediction information at the (time of) encoding of the first reference region indicated by the first reference information.

The predicted image generation unit 106 generates a predicted image based on the second reference information.

The subtraction unit 107 computes a difference between the encoding target image and the predicted image so as to generate a prediction residual.

The transformation and quantization unit 108 subjects the generated prediction residual to transformation and quantization to generate quantized data.

The inverse quantization and inverse transformation unit 109 performs inverse quantization and inverse transformation on the generated quantized data so as to generate a decoded prediction residual.

The addition unit 110 generates a decoded image by adding the decoded prediction residual to the prediction residual.

The entropy encoding unit 111 subjects the quantized data to entropy encoding so as to generate code (or encoded) data.

Figure 2:
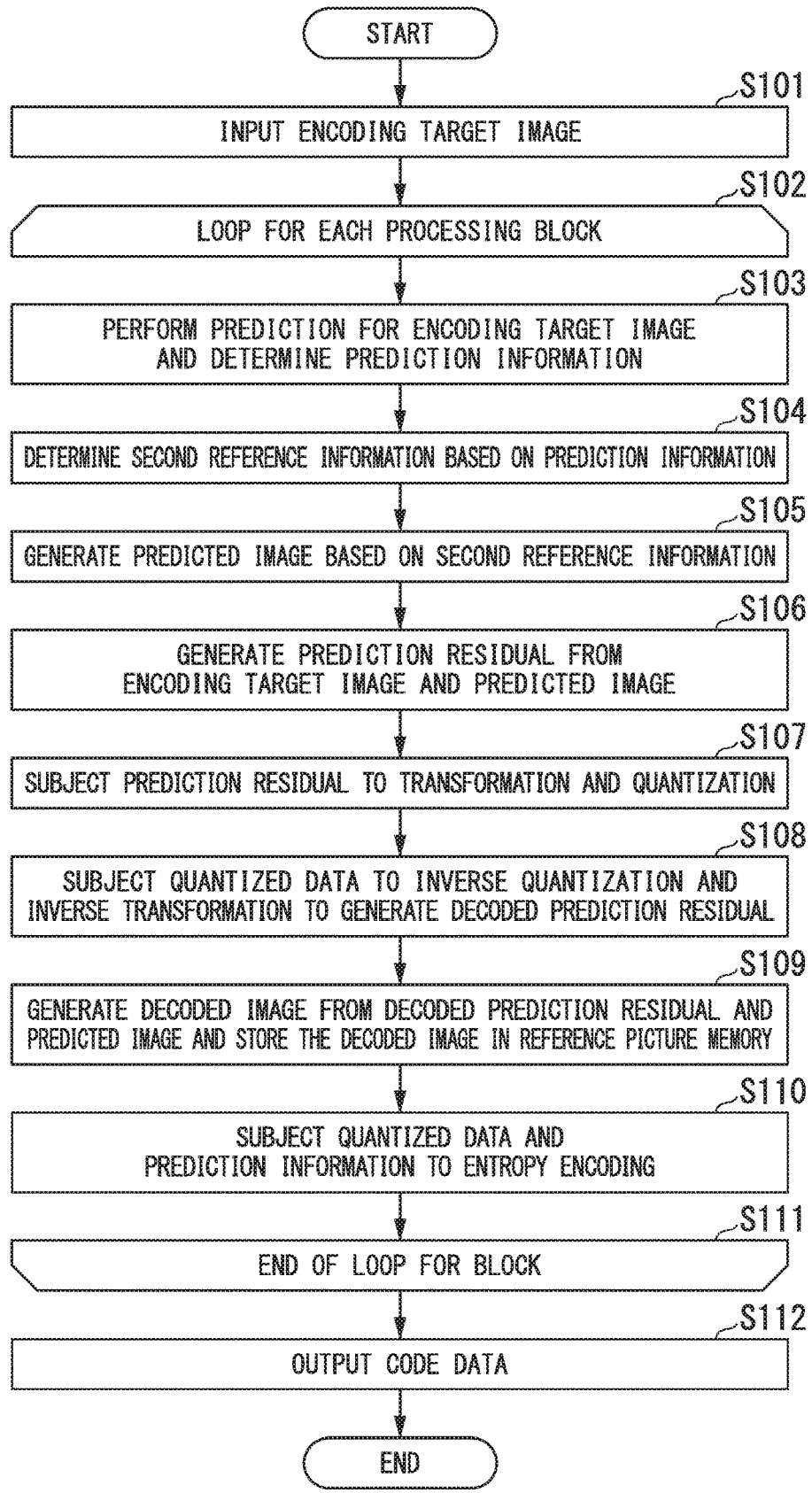
FIG. 2 is a flowchart showing the operation of the video encoding apparatus 100 shown in FIG. 1.

Next, the operation of the video encoding apparatus 100 shown in FIG. 1 will be explained with reference to FIG. 2. FIG. 2 is a flowchart showing the operation of the video encoding apparatus 100 shown in FIG. 1.

Here, it is assumed that the encoding target video is one-view video of a multi-view video, and videos of all views (viewpoints) in the multi-view video are encoded and decoded one by one. Additionally, in the operation explained here, a frame of the encoding target video is encoded. The entire video can be encoded by repeating the explained operation for each frame.

First, the encoding target video input unit 101 receives the encoding target picture (frame) and stores the frame in the input video memory 102 (see step S101).

Here, some frames in the encoding target video have been previously encoded, and decoded results thereof are stored in the reference picture memory 103. In addition, for the other videos from viewpoints other than that of the encoding target video, some frames (up to the frame that corresponds to the encoding target frame) which can be referred to have also been previously encoded and decoded, and the relevant frames are stored in the reference picture memory 103.

After the video input, the encoding target frame is divided into encoding target blocks and each block is subjected to encoding of a video signal of the encoding target frame (see steps S102 to S111).

Below, the image of the block as the encoding target is called an "encoding target block" or an "encoding target image". The following steps S103 to S110 are repeatedly executed for all blocks in the relevant picture.

In the operation repeated for each block, first, the prediction unit 104 subjects the encoding target block to inter prediction which refers to a reference picture in the reference picture memory, determines the first reference information which indicates the first reference region as the reference, and generates the prediction information which is the first reference information or information by which the first reference information can be identified (see step S103)

The above prediction may be performed by any method, and the first reference information and the prediction information may have any property.

As a typical example, the reference information which indicates the reference region is a combination of reference picture index information utilized to identify the reference picture and a vector which indicates a reference part on the reference picture. In addition, typical prediction methods includes (i) a method of determining the reference information by performing matching on a reference picture as a candidate, and (ii) a method of inheriting the reference information which was used in the encoding of a previously-encoded peripheral block (this method is called a "direct mode" or "merge mode").

Additionally, the prediction information may have any form if it can be used for determining the first reference information. The first reference information itself may be the prediction information, or identification information by which a block utilized in the merge mode or the like can be identified may be the prediction information. Any other prediction method, reference information, or prediction information may be utilized.

Furthermore, the prediction information may be encoded and multiplexed with video code data. As described above, if the prediction information can be obtained based on the prediction information for peripheral blocks or the candidate list, no encoding may be performed. Alternatively, the prediction information may be predicted and a residual thereof may be encoded.

After the prediction is competed, the second reference information determination unit 105 refers to the first reference region based on the prediction information which indicates the first reference information, and determines the second reference information which indicates the second reference region as another reference based on the prediction information (reference information) at the encoding of the first reference region (see step S104).

Similar to the first reference information, the second reference information is information by which the reference picture and the reference position can be identified. Here, the reference picture may be predetermined or determined separately. For example, it may be assumed that the second reference region is set on video from a specific viewpoint, and in this case, the second reference information may include no information which indicates the reference picture.

The second reference information may be determined in any manner. In the following example, the first reference region is set on a picture of a frame that differs from the encoding target frame but was obtained from the same viewpoint as that of the encoding target (i.e., encoding target viewpoint).

Figure 3:
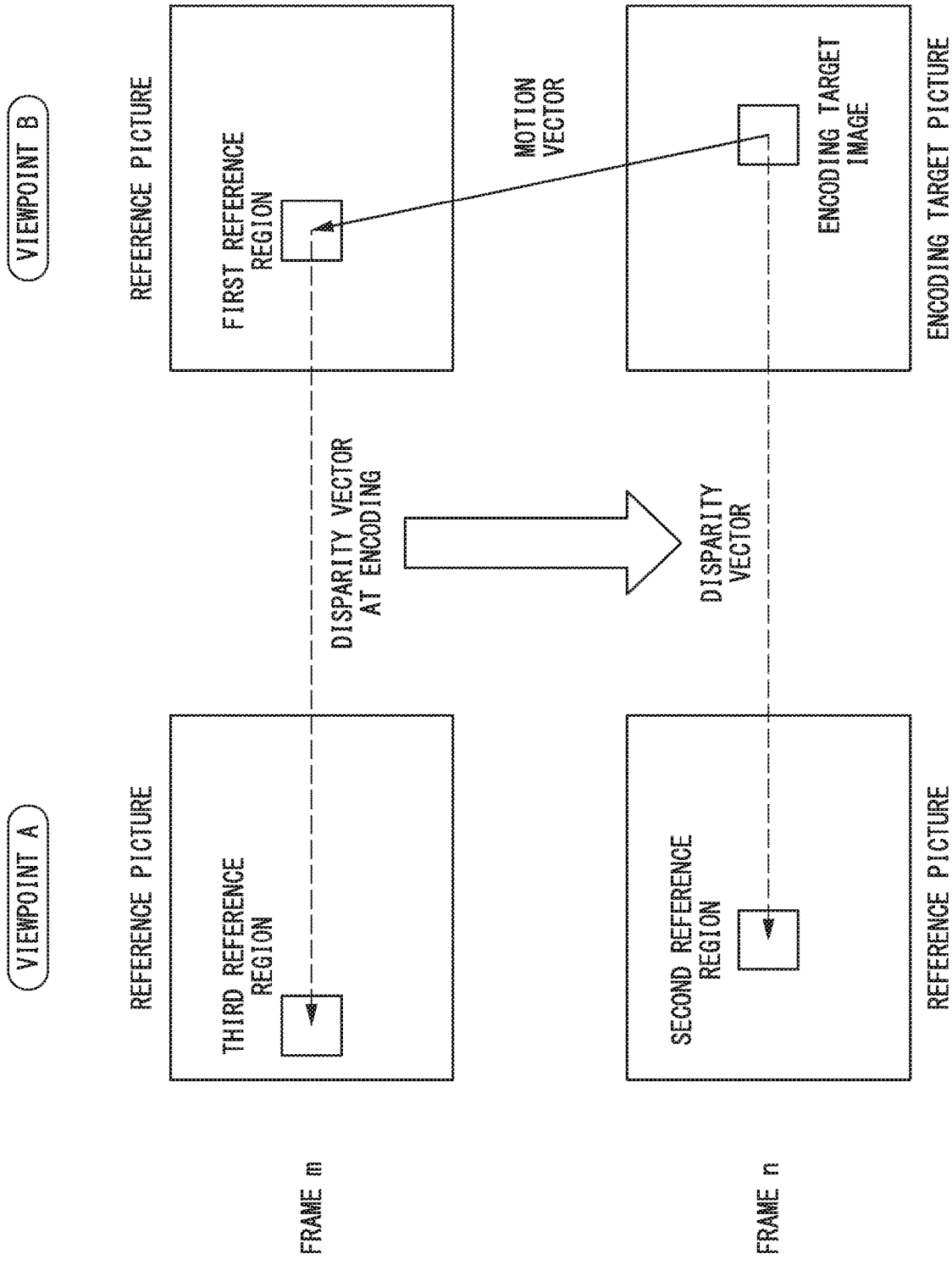
FIG. 3 is a diagram utilized to explain the operation of the video encoding apparatus 100 shown in FIG. 1.

FIG. 3 shows an example in which the encoding target image is included in a picture of frame n from viewpoint B, the first reference region indicated by the first reference information is on a reference picture of a frame m (≠n) from viewpoint B, and a reference picture index based on the prediction information at the encoding of the first reference region indicates a reference picture of a frame m from viewpoint A (≠B).

In this case, a reference picture index that indicates a reference picture of a frame n from viewpoint and a disparity vector based on the prediction information at the encoding of the first reference region may be determined to the second reference information, so as to perform disparity compensation prediction based on the second reference information.

In the above example, the first reference region is set on a picture of a different frame from the same viewpoint as the encoding target viewpoint. However, a similar method can be utilized when the first reference region is set on a picture of the same frame (as the encoding target frame) from a viewpoint that differs from the encoding target viewpoint. Furthermore, even in a case in which the prediction information of the first reference region indicates a further different frame from the same viewpoint, a similar method can be employed where prediction information of the relevant region is utilized to refer to a different region.

The second reference information may be determined based on prediction information in a candidate list for the first reference region or an NBDV therefore. Any other method may be utilized for the relevant determination.

The second reference information may be assigned to each part as a unit, for example, each encoding target block or each sub-block which is smaller than the encoding target block. The size of the sub-block may be determined in any manner. Specifically, the size may be predetermined or selected from among predetermined sizes, or any size may be adaptively determined. In addition, the second reference information may be determined for each pixel.

In the adaptive determination, the target size may be determined based on the block size at the encoding of the first reference region, the size of the sub-block, or other information. For example, if the first reference information for the encoding target image is assigned to each block of 16×16 pixels obtained by dividing the encoding target block and prediction of the first reference region was performed (in the encoding thereof) for each block of 8×8 pixels, then for the encoding target image, the second reference region may be determined for each block of 8×8 pixels.

If the block size of the encoding target image or the size of the sub-block differs from the size employed when the first reference region was encoded, or the block position of the former does not coincide with the block position of the latter, then one or more of prediction information items obtained in the reference range may be selected to be utilized to determine the second reference information.

For example, it may be predetermined to always use upper-left prediction information within the reference region or to use an average or median of a plurality of prediction information items.

Additionally, the second reference information may be determined after correcting the prediction information of the first reference region. The correction may be performed by any method.

In an example, a correction coefficient utilized to conform the prediction information of the first reference region to the encoding target image is determined based on (i) a vector in the candidate list for the encoding target block (i.e., prediction information of peripheral blocks) or a relevant NBDV and (ii) a vector in the candidate list for the first reference region or a relevant NBDV. Here, the correction coefficient may have any property, that is, may be a parameter for scaling or offsetting, or an identifier utilized to designate one of predetermined parameters which is used.

The correction may also be performed by utilizing information (e.g., camera parameter) apart from video.

For example, if it is assumed that the second reference region is set on a reference picture from a viewpoint other than the viewpoint indicated by the prediction information of the first reference region, then a disparity vector obtained by the prediction information of the first reference information may be converted by using a camera parameter and the converted result may be determined to be the second reference information. In addition, information pertaining to the correction may be encoded and multiplexed with the relevant video, where the correction coefficient itself may be encoded or an identifier that designates one of predetermined correction coefficients which is used. Additionally, if equivalent information can be obtained by a corresponding decoding apparatus, no encoding is necessary.

After the generation of the second reference information is completed, the predicted image generation unit 106 generates a predicted image based on the second reference information (see step S105).

The predicted image may be generated by means of motion compensation or disparity compensation which uses only the second reference information. In another method, another predicted image may be generated by motion compensation or disparity compensation which uses the first reference information and a final predicted image may be generated by mixing the two predicted images. Furthermore, if weighted mixing is performed in bidirectional prediction, any weighting factor may be employed.

If any prediction or bidirectional prediction is performed in a certain unit such as the encoding target block or a smaller unit such as a sub-block, information which indicates the type of prediction assigned to each unit part may be encoded and multiplexed with the relevant video. Here, if the weighted mixing is performed, the weighting factor may be encoded and multiplexed. However, no encoding is necessary if the prediction method (and the weighting factor) can be determined by a corresponding decoding apparatus.

Next, the subtraction unit 107 generates a prediction residual by computing a difference between the predicted image and the encoding target block (see step S106).

When the generation of the prediction residual is completed, the transformation and quantization unit 108 subjects the prediction residual to transformation and quantization to generate quantized data (see step S107). The transformation and quantization may be performed by any method if the obtained data can be accurately inverse-quantized and inverse-transformed in a decoding process.

When the transformation and quantization is completed, the inverse quantization and inverse transformation unit 109 subjects the quantized data to inverse quantization and inverse transformation to generate a decoded prediction residual (see step S108).

Next, when the generation of the decoded prediction residual is completed, the addition unit 110 adds the decoded prediction residual to the predicted image so as to generate a decoded image which is stored in the reference picture memory 103 (see step S109).

In this process, the decoded image may be multiplied by a loop filter, if necessary. In general video encoding, encoding noise is removed utilizing a deblocking filter or another filter.

Next, the entropy encoding unit 111 subjects the quantized data to entropy encoding so as to generate code data. If necessary, prediction information, residual prediction information, or other additional information may also be encoded and multiplexed with the code data (see step S110). After all blocks are processed (see step S111), the code data is output (see step S112).

Figure 4:
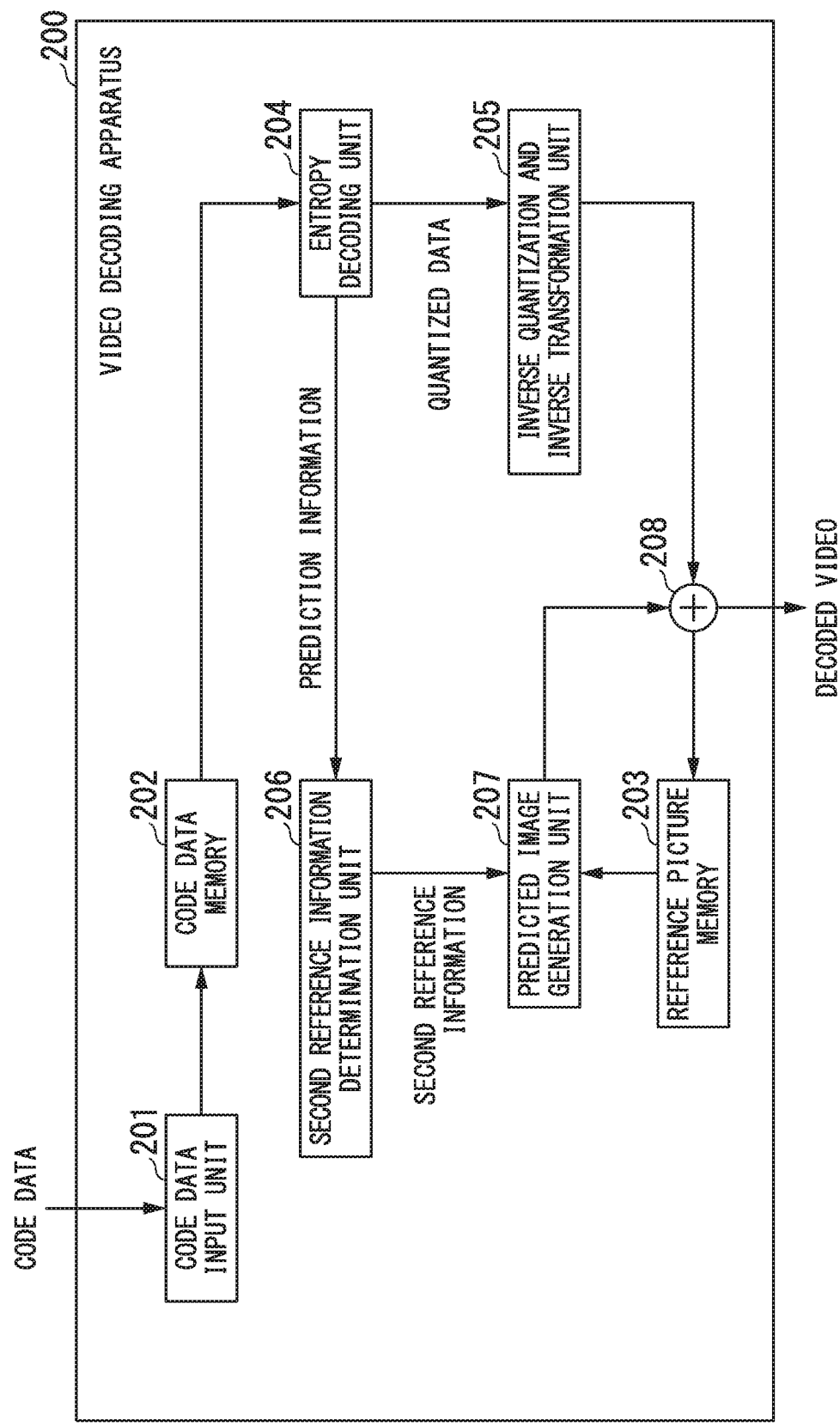
FIG. 4 is a block diagram that shows the structure of a video decoding apparatus 200 according to the first embodiment of the present invention.

Below, the video decoding apparatus will be explained. FIG. 4 is a block diagram that shows the structure of a video decoding apparatus in the first embodiment of the present invention.

As shown in FIG. 4, the video decoding apparatus 200 includes a code data input unit 201, a code data memory 202, a reference picture memory 203, an entropy decoding unit 204, an inverse quantization and inverse transformation unit 205, a second reference information determination unit 206, a predicted image generation unit 207, and an addition unit 208.

Video code data as a decoding target is input into the video decoding apparatus 200 via the code data input unit 201. Below, this video code data as a decoding target is called a "decoding target video code data". In particular, a frame to be processed is called a "decoding target frame" or a "decoding target picture".

The code data memory 202 stores the code data of the input decoding target video. The reference picture memory 203 stores images which have been previously decoded.

The entropy decoding unit 204 subjects the code data of the decoding target picture to entropy decoding, and the inverse quantization and inverse transformation unit 205 subjects the relevant quantized data to inverse quantization and inverse transformation so as to generate a decoded prediction residual.

The second reference information determination unit 206 determines second reference information from the prediction information at the encoding of the first reference region which is set based on the prediction information which may be received from the entropy decoding unit 204.

The predicted image generation unit 207 generates a predicted image based on the second reference information.

The addition unit 208 generates a decoded image by adding the decoded prediction residual to the predicted image.

Figure 5:
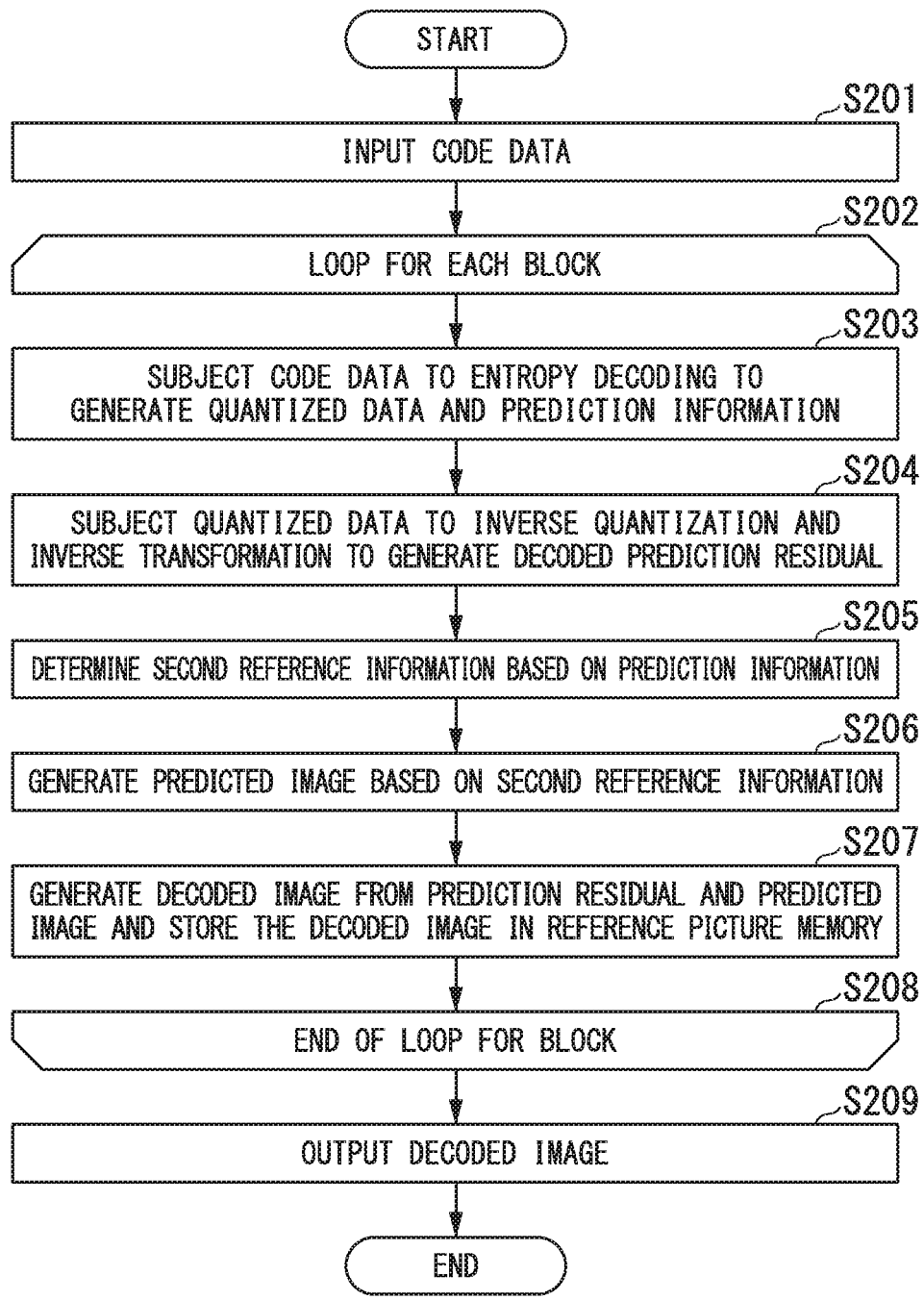
FIG. 5 is a flowchart showing the operation of the video decoding apparatus 200 shown in FIG. 4.

Next, the operation of the video decoding apparatus shown in FIG. 4 will be explained with reference to FIG. 5. FIG. 5 is a flowchart showing the operation of the video decoding apparatus 200 shown in FIG. 4.

Here, it is assumed that the decoding target video is one-view video of a multi-view video, and videos of all views (viewpoints) in the multi-view video are decoded one by one. Additionally, in the operation explained here, a frame of the code data is decoded. The entire video can be decoded by repeating the explained operation for each frame.

First, the code data input unit 201 receives code data and stores the data in the code data memory 202 (see step S201).

Here, some frames in the decoding target video have been previously decoded, and the relevant decoded results are stored in the reference frame memory 203. In addition, for the other videos from viewpoints other than that of the decoding target video, some frames (up to the frame that corresponds to the encoding target frame) which can be referred to have also been previously decoded, and the relevant decoded frames are stored in the reference picture memory 203.

After the video input, the decoding target picture is divided into decoding target blocks and each block is subjected to decoding of a video signal of the decoding target picture (see steps S202 to S208).

Below, the image of the block as the decoding target is called a "decoding target block" or a "decoding target image". The following steps S203 to S207 are repeatedly executed for all blocks in the frame.

In the operation repeated for each decoding target block, first, the entropy decoding unit 204 subjects the code data to entropy decoding (see step S203).

The inverse quantization and inverse transformation unit 205 performs the inverse quantization and inverse transformation so as to generate a decoded prediction residual (see step S204). If prediction information or other additional information is included in the code data, such information may also be decoded so as to appropriately generate required information.

Next, the second reference information determination unit 206 refers to the first reference region which is a region on a reference picture indicated by the first reference information based on the prediction information, and determines the second reference information based on the prediction information at the encoding of the first reference region (see step S205).

The details of the first reference information and the second reference information and the methods of determining them are similar to those explained for the video encoding apparatus. After the completion of the second reference information, the predicted image generation unit 207 generates a predicted image based on the second reference information (see step S206).

Next, when the generation of the predicted image is completed, the addition unit 208 adds the decoded prediction residual to the predicted image so as to generate a decoded image which is stored in the reference picture memory (see step S207).

In addition, the decoded image may be multiplied by a loop filter, if necessary. In ordinary video encoding, encoding noise is removed utilizing a deblocking filter or another filter.

After all blocks are processed (see step S208), the result is output as a decoded frame (see step S209).

Second Embodiment

Figure 6:
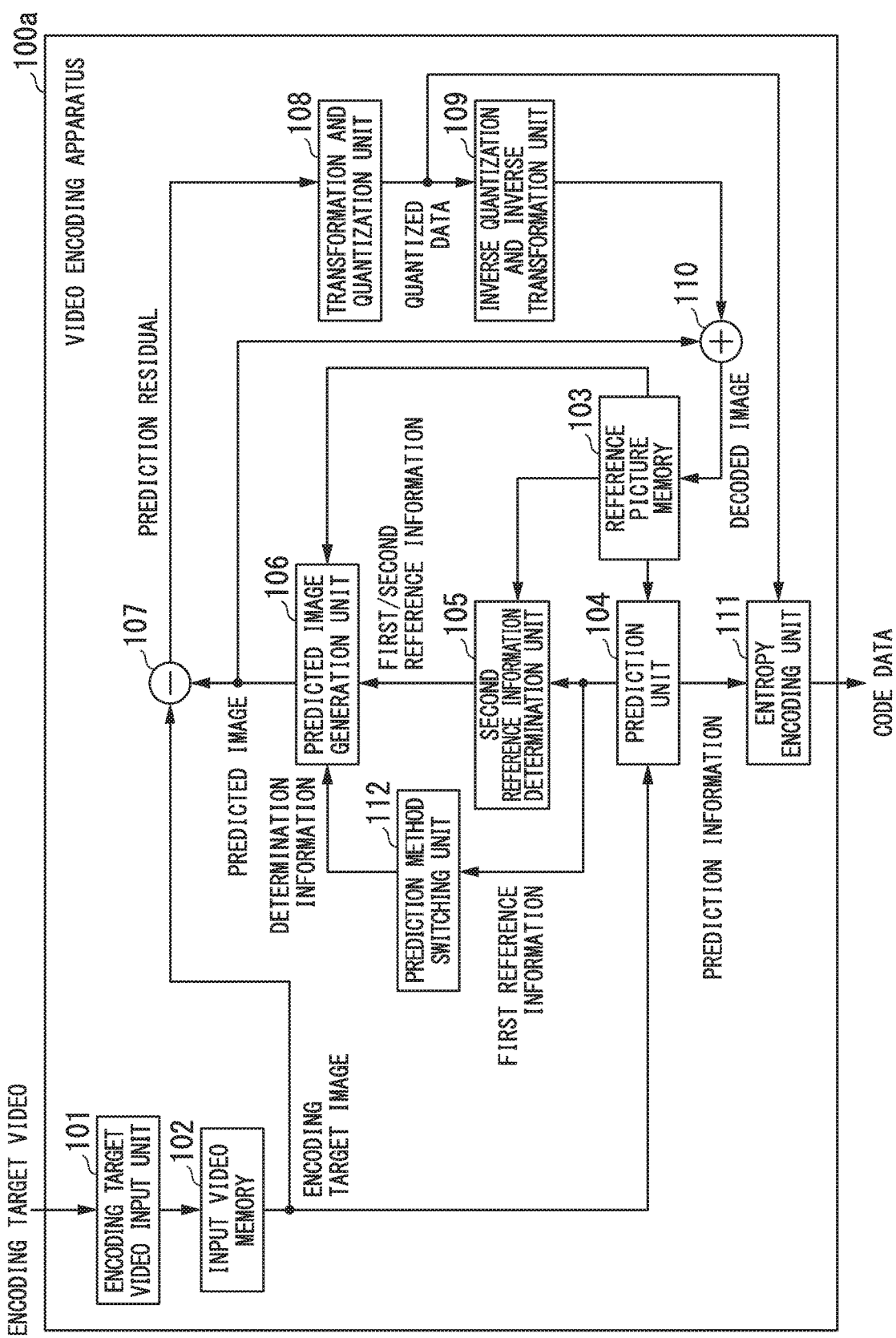
FIG. 6 is a block diagram that shows the structure of a video encoding apparatus 100a according to a second embodiment of the present invention.

Below, a second embodiment will be explained. FIG. 6 is a block diagram showing the structure of a video encoding apparatus 100a according to the second embodiment of the present invention. In FIG. 6, parts identical to those in FIG. 1 are given identical reference numerals and explanations thereof are omitted here.

In comparison with the apparatus of FIG. 1, the apparatus of FIG. 6 has an additional unit which is a prediction method switching unit 112. The prediction method switching unit 112 determines switching determination information which indicates the prediction method (using any one or both of the first reference information and the second reference information) employed by the predicted image generation unit 106 when performing the inter prediction to generate the predicted image.

Figure 7:
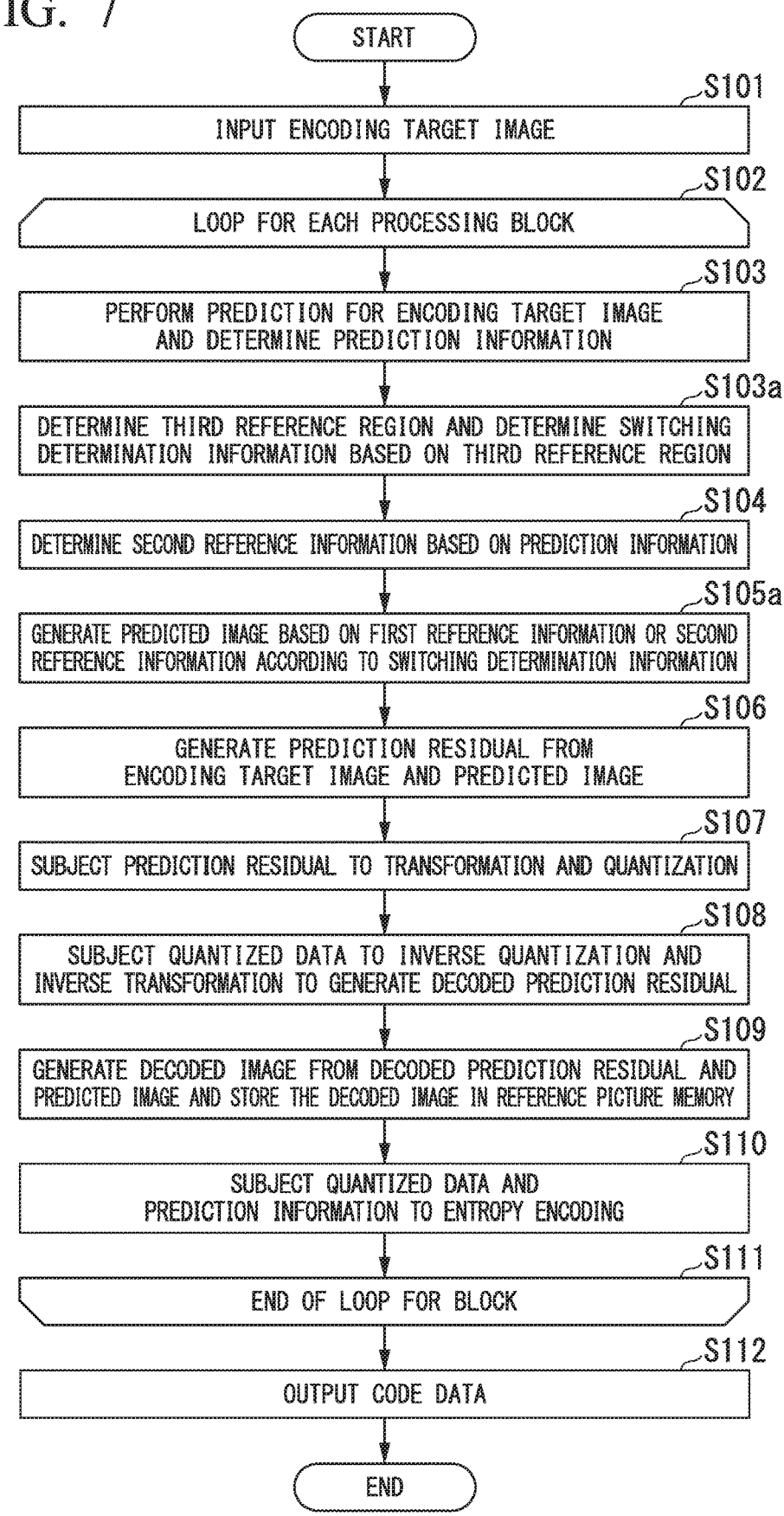
FIG. 7 is a flowchart showing the operation of the video encoding apparatus 100a shown in FIG. 6.

Next, the operation of the video encoding apparatus 100a shown in FIG. 6 will be explained with reference to FIG. 7. FIG. 7 is a flowchart showing the operation of the video encoding apparatus 100a shown in FIG. 6. In FIG. 7, steps identical to those in FIG. 2 are given identical step numbers and explanations thereof are omitted here.

First, in steps S101 to S103, processes similar to those of the corresponding steps in the operation of FIG. 2 are performed.

Then the prediction method switching unit 112 determines the switching determination information which indicates the prediction method (using any one or both of the first reference information and the second reference information) employed by the predicted image generation unit 106 when performing the inter prediction to generate the predicted image (see step S103a).

The switching determination may be performed by any method. Additionally, similar to the first embodiment, this determination may be executed in any unit.

As a switching determination method, the prediction method may be determined by utilizing the prediction residual at the encoding of the first reference region. In such a method, if the prediction residual for the first reference region is large in a certain block, it may be determined that the accuracy of the second reference region is low in the relevant region and switching may be performed to execute the prediction by using only the first reference information.

In another method, the prediction method may be determined by referring to the prediction information at the encoding of the second reference region and comparing the prediction information with the first reference information. If the reference picture at the encoding of the second reference information belongs to the same frame or is obtained from the same viewpoint as that of the reference picture indicated by the first reference information, then for a block in which vectors which indicates the relevant reference destinations considerably differ from each other, it may be determined that the accuracy of the second reference region is low in the relevant region and switching may be performed to execute the prediction by using only the first reference information.

In another method, the prediction method may be determined by referring to a third reference region which was referred to when the first reference region was encoded. The third reference region may be determined in any method. For example, the third reference region may be determined by referring to information at the encoding of the first reference region. In another method, the process in step S104 is first executed so as to determine the information for the second reference region, and the third reference region may be determined based on the information determined first.

In the following example, the first reference region is set on a picture of a frame that differs from the encoding target frame but was obtained from the same viewpoint as that of the encoding target (i.e., encoding target viewpoint).

Figure 8:
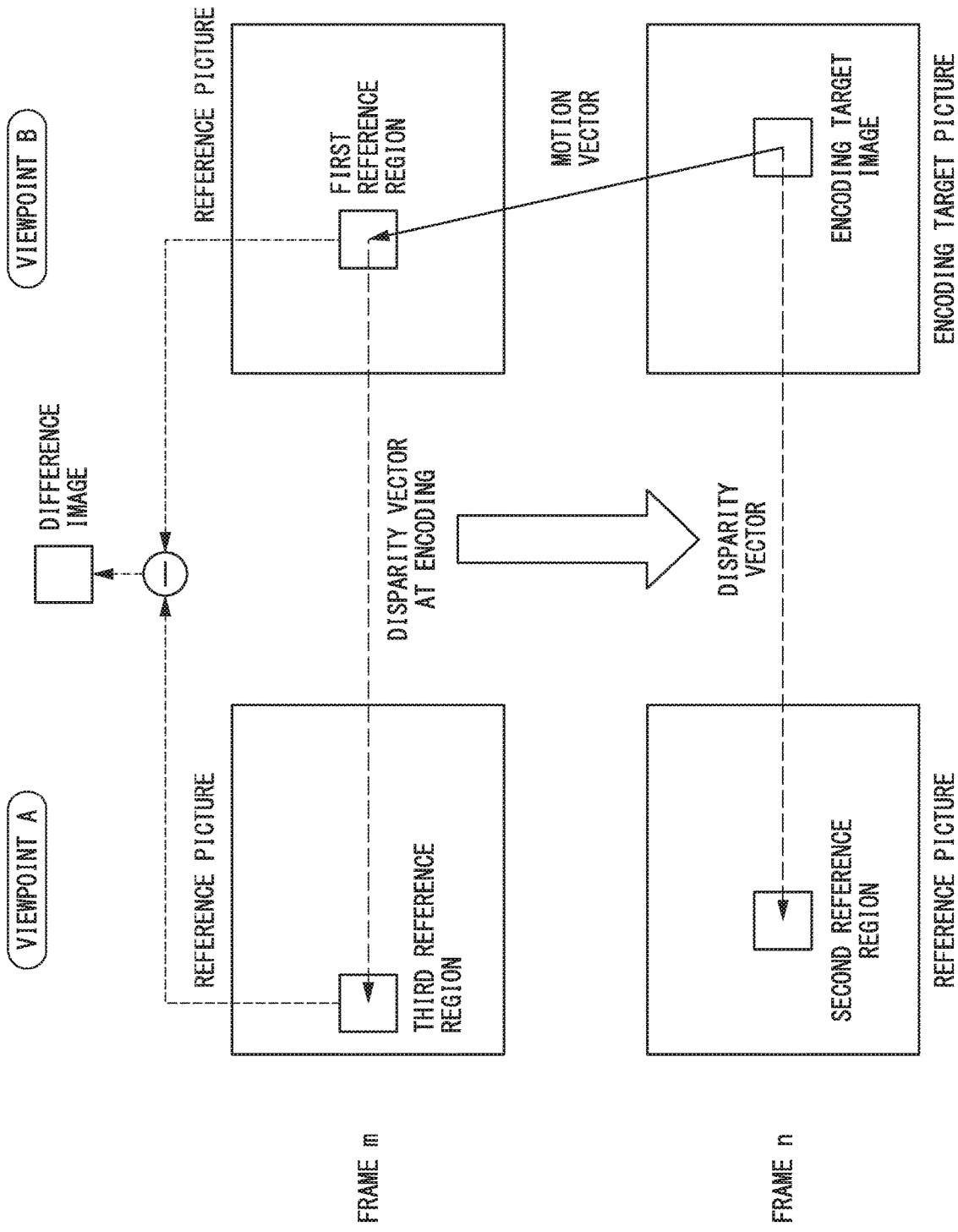
FIG. 8 is a diagram utilized to explain the operation of the video encoding apparatus 100a shown in FIG. 6.

FIG. 8 shows an example in which the encoding target image is included in a picture of frame n from viewpoint B, the first reference region indicated by the first reference information is on a reference picture of a frame m (≠n) from viewpoint B, and a reference picture index based on the prediction information at the encoding of the first reference region indicates a reference picture of a frame m from viewpoint A (≠B).

In this case, the third reference region is present on a reference picture of frame m from viewpoint A (≠B).

In this example, it is possible that a difference between the image of the first reference region and the image of the third reference region is computed and determined to be a difference image, the accuracy of the prediction which utilizes the second reference information is estimated based on the difference image, and the first reference information is used without using the second reference information if the accuracy is low.

In this process, the estimation of the prediction accuracy may be performed in any method. For example, the difference image is regarded as a residual generated by prediction which utilizes the second reference information, and an absolute value or average of residual within the relevant block or an amount of code generated when performing relevant transformation and encoding is estimated. In addition, the determination based on the estimated prediction accuracy or amount of code may be performed in any manner. For example, the determination may be performed by utilizing a predetermined threshold.

Figure 9:
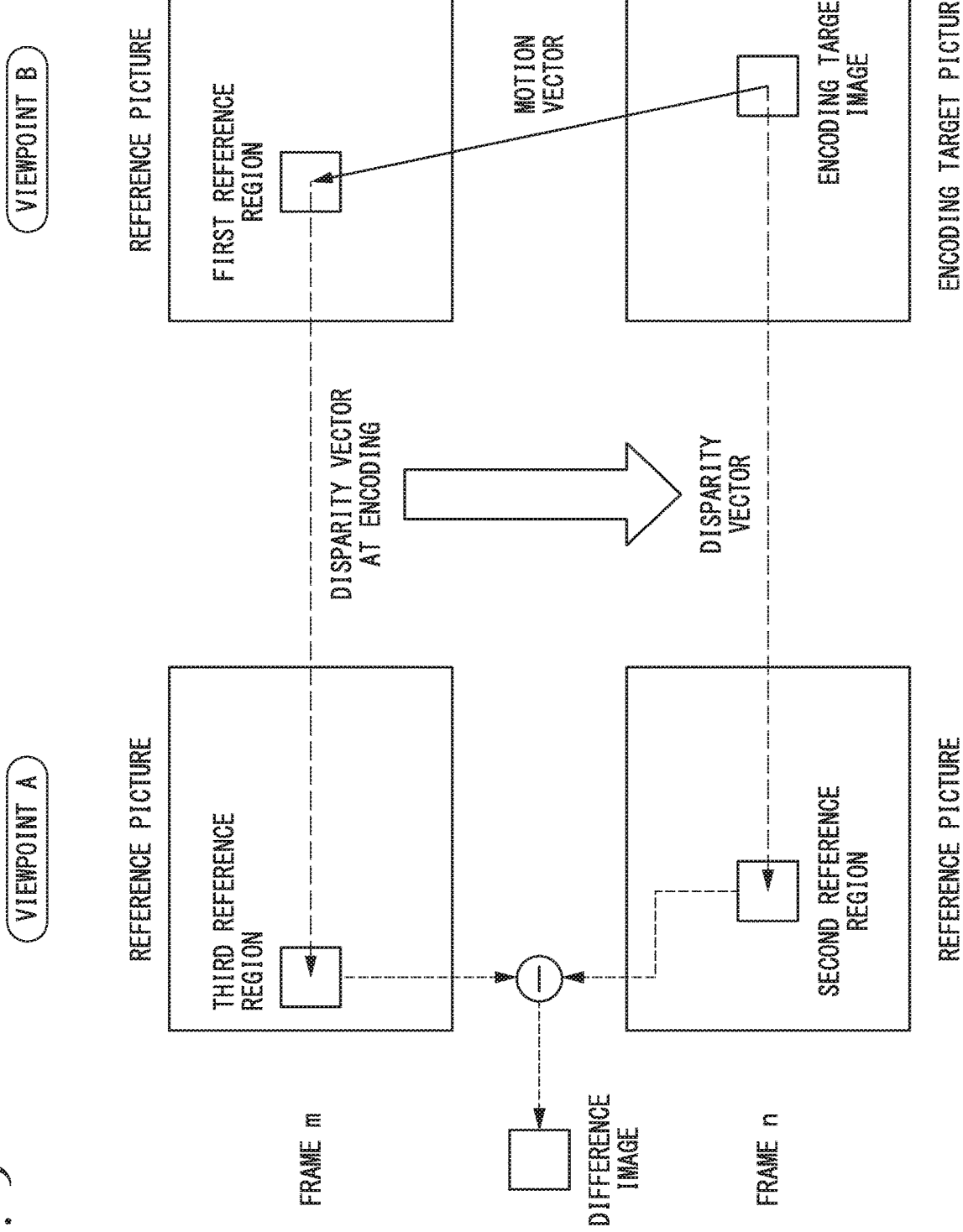
FIG. 9 is also a diagram utilized to explain the operation of the video encoding apparatus 100a shown in FIG. 6.

Furthermore, as shown in FIG. 9, a difference between the image of the second reference region and the image of the third reference region may be computed and determined to be a second difference image, which may be utilized in the relevant determination together with the first difference image (i.e., difference image shown in FIG. 8). In this case, the determination may be performed in a manner such that information corresponding to one of estimated prediction accuracies is employed.

When the information for the second reference region is also used in the determination, the process in step S104 may be executed prior to step S103a.

The process in step S104 is executed in a manner similar to that executed in the operation shown in FIG. 2. However, for a sub-block for which it is determined by the switching determination that only the first reference information is utilized, the second reference information determination step S104 can be omitted.

Next, according to the switching determination information, the predicted image generation unit 106 generates a predicted image based on the first reference information or the second reference information, or both of them (see step S105a). Here, the flowchart of FIG. 7 simply describes "first reference information or second reference information".

In steps S106 to S112, processes similar to those of the corresponding steps in the operation of FIG. 2 are performed.

Figure 10:
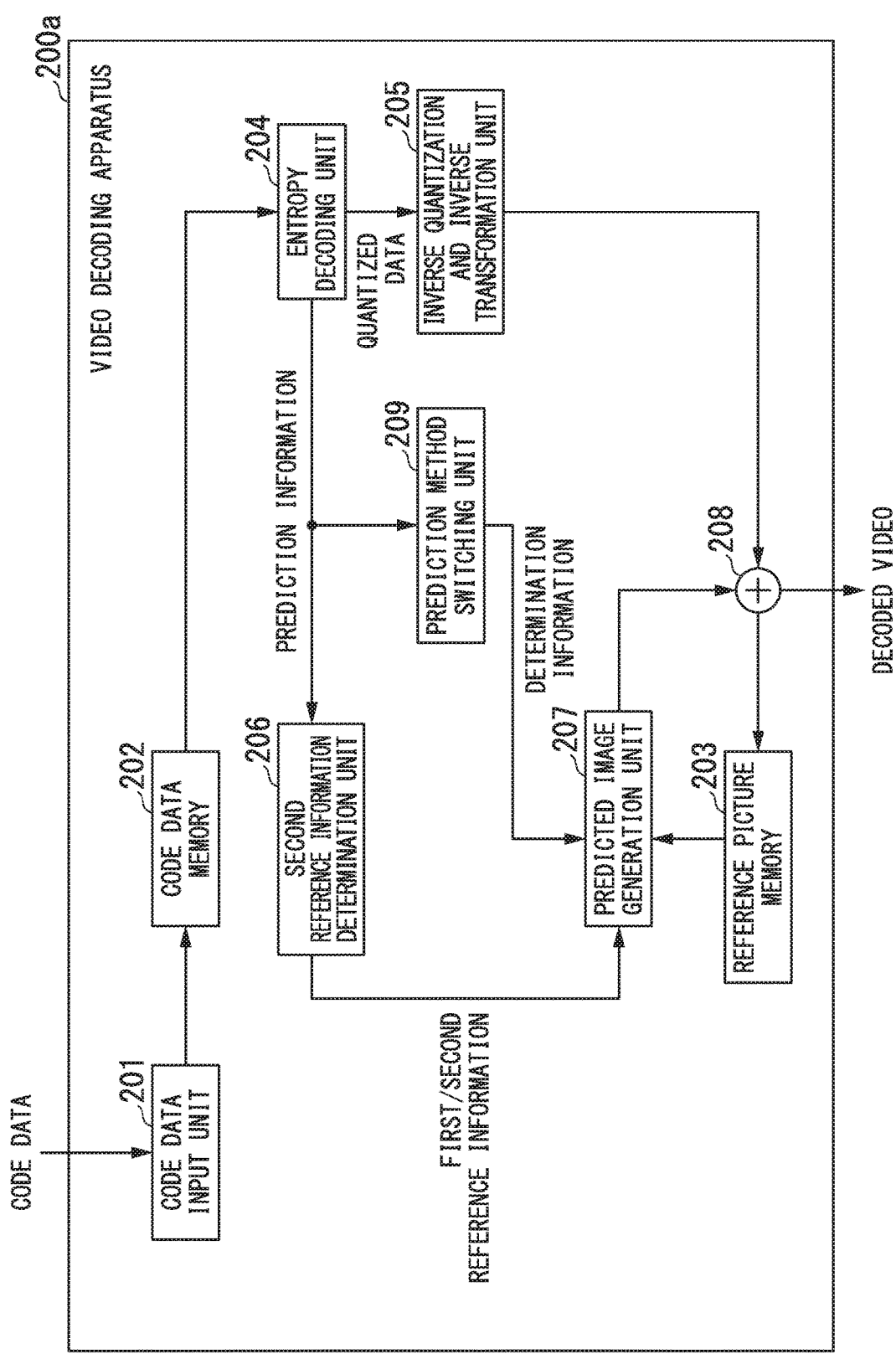
FIG. 10 is a block diagram that shows the structure of a video decoding apparatus 200a according to the second embodiment of the present invention.

Next, a corresponding video decoding apparatus will be explained. FIG. 10 is a block diagram that shows the structure of the video decoding apparatus 200a according to the second embodiment of the present invention. In FIG. 10, parts identical to those in FIG. 4 are given identical reference numerals and explanations thereof are omitted here.

In comparison with the apparatus of FIG. 4, the apparatus of FIG. 10 has an additional unit which is a prediction method switching unit 209. The prediction method switching unit 209 determines switching determination information which indicates the prediction method (using any one or both of the first reference information and the second reference information) employed by the predicted image generation unit 207 when performing the inter prediction to generate the predicted image.

Figure 11:
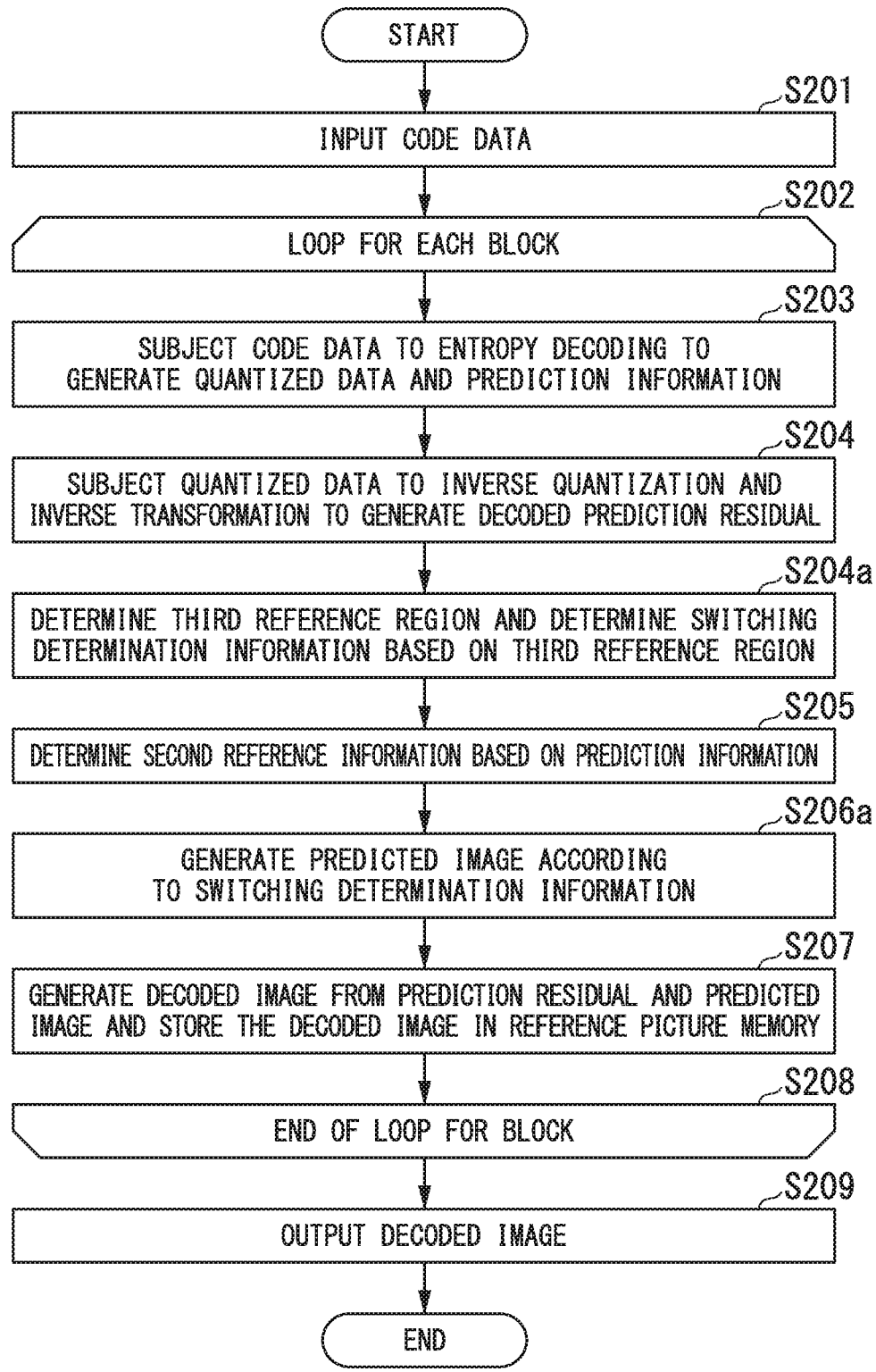
FIG. 11 is a flowchart showing the operation of the video decoding apparatus 200a shown in FIG. 10.

Next, the operation of the video decoding apparatus shown in FIG. 10 will be explained with reference to FIG. 11. FIG. 11 is a flowchart showing the operation of the video decoding apparatus 200a shown in FIG. 10. In FIG. 11, steps identical to those in FIG. 5 are given identical step numbers and explanations thereof are omitted here.

First, in steps S201 to S204, processes similar to those of the corresponding steps in the operation of FIG. 5 are performed.

Then the prediction method switching unit 209 determines the switching determination information which indicates the prediction method (using any one or both of the first reference information and the second reference information) employed by the predicted image generation unit 207 when performing the inter prediction to generate the predicted image (see step S204a). The switching method and other details are similar to those in the above video encoding apparatus.

The process in step S205 is executed in a manner similar to that executed in the operation shown in FIG. 5. However, for a sub-block for which it is determined by the switching determination that only the first reference information is utilized, the second reference information determination step S205 can be omitted.

Next, according to the switching determination information, the predicted image generation unit 207 generates a predicted image based on the first reference information or the second reference information, or both of them (see step S206a).

In steps S207 to S209, processes similar to those of the corresponding steps in the operation of FIG. 5 are performed.

Third Embodiment

Figure 12:
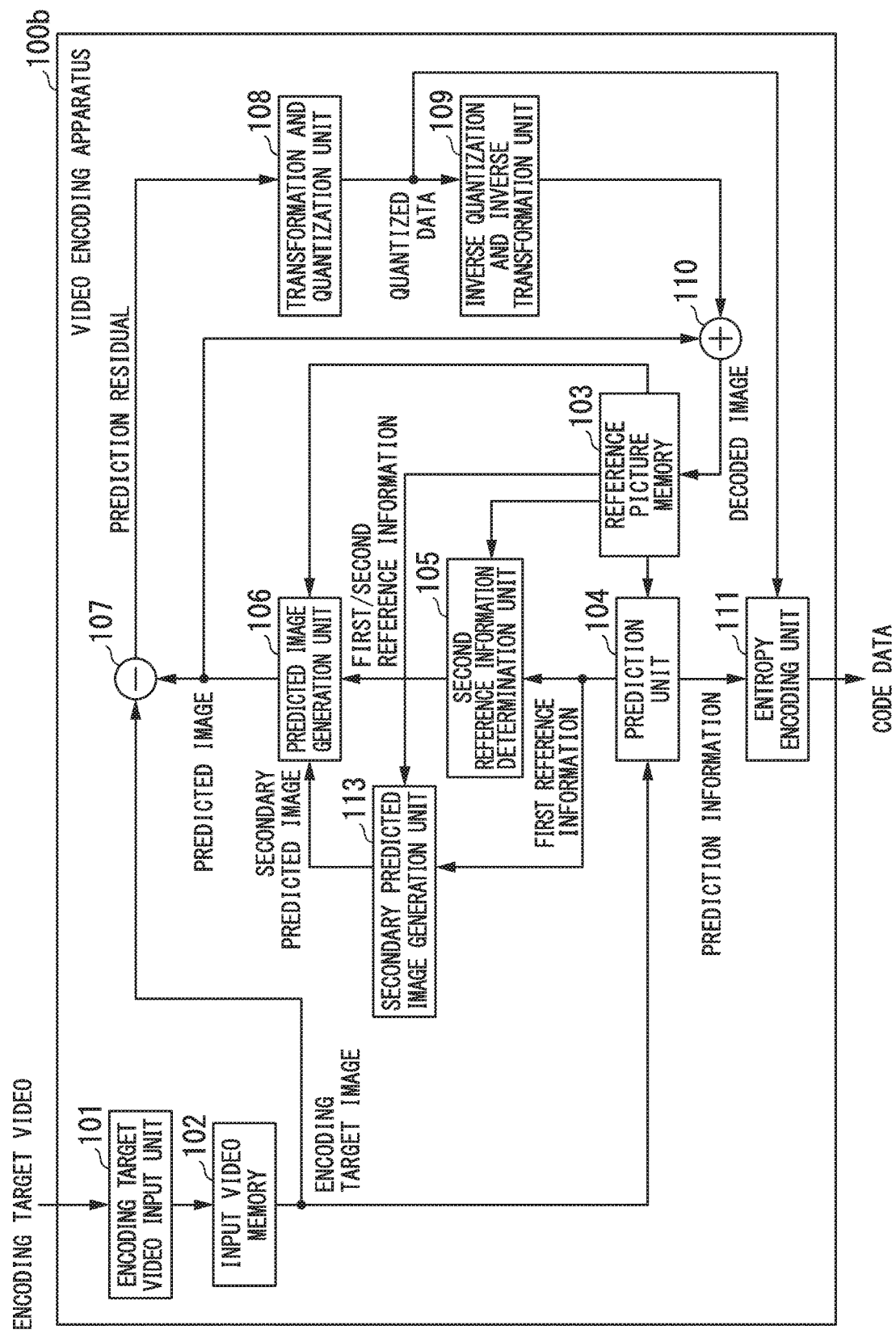
FIG. 12 is a block diagram showing the structure of a video encoding apparatus 100b according to a third embodiment of the present invention.

Below, a third embodiment will be explained. FIG. 12 is a block diagram showing the structure of a video encoding apparatus 100b according to the third embodiment of the present invention. In FIG. 12, parts identical to those in FIG. 1 are given identical reference numerals and explanations thereof are omitted here.

In comparison with the apparatus of FIG. 1, the apparatus of FIG. 12 has an additional unit which is a secondary predicted image generation unit 113. The secondary predicted image generation unit 113 refers to a third reference region, which is a reference (destination) used when the first reference region was encoded, based on prediction information at the encoding of the first reference region, and generates a secondary predicted image which is a predicted image at the encoding of the first reference region.

Figure 13:
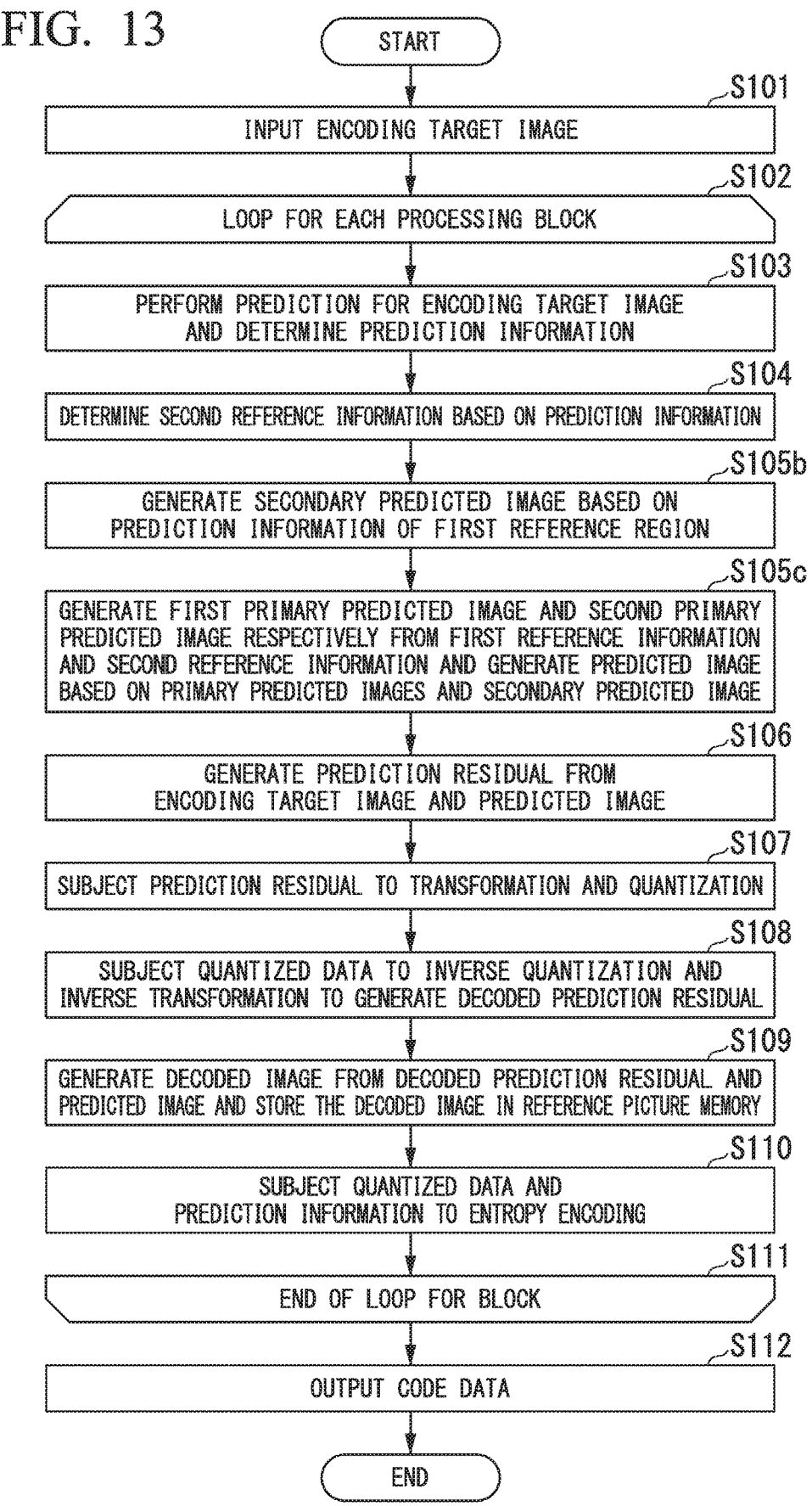
FIG. 13 is a flowchart showing the operation of the video encoding apparatus 100b shown in FIG. 12.

Next, the operation of the video encoding apparatus 100b shown in FIG. 12 will be explained with reference to FIG. 13. FIG. 13 is a flowchart showing the operation of the video encoding apparatus 100b shown in FIG. 12. In FIG. 13, steps identical to those in FIG. 2 are given identical step numbers and explanations thereof are omitted here.

First, in steps S101 to S104, processes similar to those of the corresponding steps in the operation of FIG. 2 are performed.

Then the secondary predicted image generation unit 113 refers to the third reference region, which is the reference used when the first reference region was encoded, based on prediction information at the encoding of the first reference region, and generates the above-described secondary predicted image by means of motion compensation or disparity compensation (see step S105b).

The third reference region may be determined in any manner. For example, it may be determined by utilizing the second reference information generated in step S104 or by separately referring to prediction information at the encoding of the first reference region. Additionally, similar to the second reference region determination in the first embodiment, the determination may be performed in any unit. This unit may be the same as that used in the second reference region determination or another unit may be employed.

After generating the secondary predicted image, the predicted image generation unit 106 generates a first primary predicted image based on the first reference information and a second primary predicted image based on the second reference information. Based on the first primary predicted image, the second primary predicted image, and the secondary predicted image, the predicted image generation unit 106 generates a predicted image (see step S105c).

The predicted image generation may be performed in any manner. In the following example, the first reference region is set on a picture of a frame that differs from the encoding target frame but was obtained from the same viewpoint as that of the encoding target (i.e., encoding target viewpoint).

Figure 14:
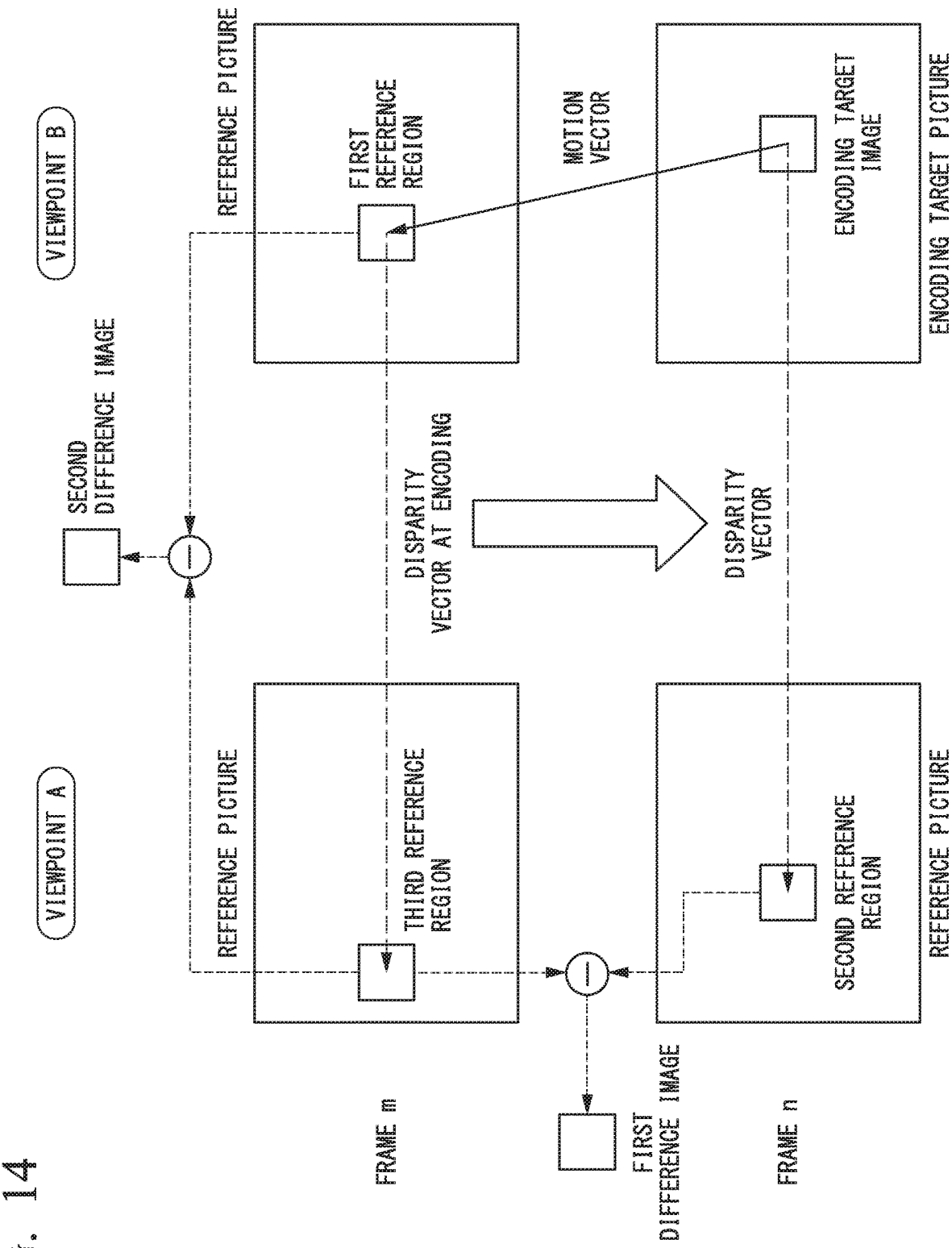
FIG. 14 is a diagram utilized to explain the operation of the video encoding apparatus 100b shown in FIG. 12.

FIG. 14 shows an example in which the encoding target image is included in a picture of frame n from viewpoint B, the first reference region indicated by the first reference information is on a reference picture of a frame m ($\neq$n) from viewpoint B, and a reference picture index based on the prediction information at the encoding of the first reference region indicates a reference picture of a frame m from viewpoint A ($\neq$B).

In this case, the third reference region is present on a reference picture of frame m from viewpoint A ($\neq$B).

In this example, when the predicted image is generated by subjecting the first primary predicted image to residual prediction, a difference ("first difference image" in FIG. 14) between the second primary predicted image and the secondary predicted image is determined to be a predicted value of the residual in the relevant motion compensation and is added to the first primary predicted image, so as to generated the predicted image.

If $I_1$, $I_2$, and $I_3$ respectively denote the first primary predicted image, the second primary predicted image, and the secondary predicted image, the predicted image I is represented by the following formula (1):

$$I = I_1 + (I_2 - I_3) \qquad (1)$$

In the predicted image generation, the predicted image may be generated in a single process based on the formula (1), or it is possible to separately generate a difference image and add the difference image to the first primary predicted image, so as to generated the predicted image. Any other procedure may be employed to perform the residual prediction and generate the predicted image.

Also, when the predicted image is generated by subjecting the second primary predicted image to residual prediction, the above formula is effective to generate a predicted image (addition of "second difference image" in FIG. 14 to the second primary predicted image is equivalent to formula (1)).

In the above example, the first reference region is set on a picture of a different frame from the same viewpoint as the encoding target viewpoint. However, a similar method can be utilized when the first reference region is set on a picture of the same frame (as the encoding target frame) from a viewpoint that differs from the encoding target viewpoint.

In steps S106 to S112, processes similar to those of the corresponding steps in the operation of FIG. 2 are performed.

Figure 15:
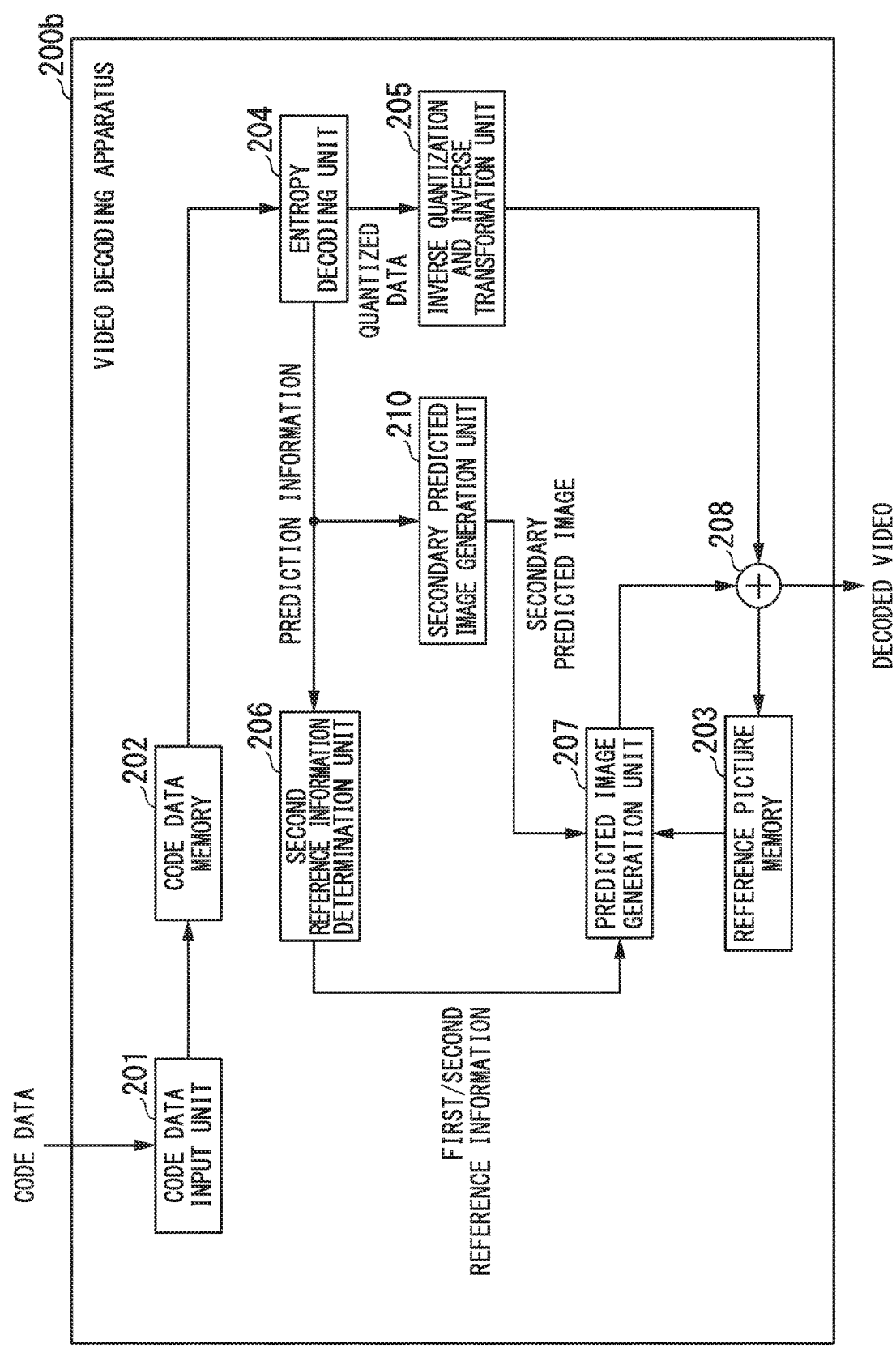
FIG. 15 is a block diagram that shows the structure of a video decoding apparatus 200b according to the third embodiment of the present invention.

Next, a corresponding video decoding apparatus will be explained. FIG. 15 is a block diagram that shows the structure of the video decoding apparatus 200b according to the third embodiment of the present invention. In FIG. 15, parts identical to those in FIG. 4 are given identical reference numerals and explanations thereof are omitted here.

In comparison with the apparatus of FIG. 4, the apparatus of FIG. 15 has an additional unit which is a secondary predicted image generation unit 210. The secondary predicted image generation unit 210 refers to a third reference region, which is a reference (destination) used when the first reference region was encoded, based on prediction information at the encoding of the first reference region, and generates a secondary predicted image which is a predicted image at the encoding of the first reference region.

Figure 16:
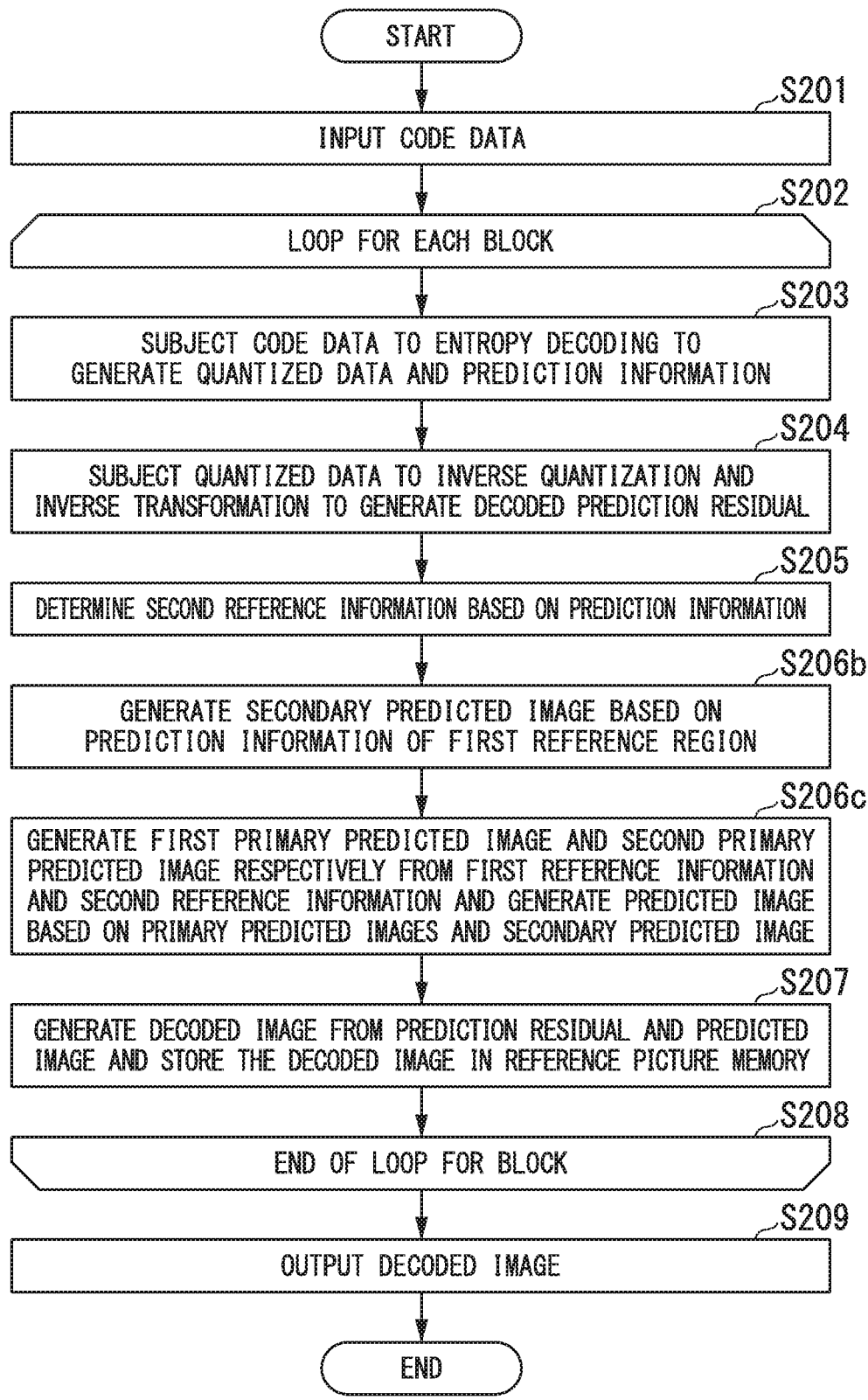
FIG. 16 is a flowchart showing the operation of the video decoding apparatus 200b shown in FIG. 15.

Next, the operation of the video decoding apparatus 200b shown in FIG. 15 will be explained with reference to FIG. 16. FIG. 16 is a flowchart showing the operation of the video decoding apparatus 200b shown in FIG. 15. In FIG. 16, steps identical to those in FIG. 5 are given identical step numbers and explanations thereof are omitted here.

First, in steps S201 to S205, processes similar to those of the corresponding steps in the operation of FIG. 5 are performed.

Then the secondary predicted image generation unit 210 refers to the third reference region, which is the reference used when the first reference region was encoded, based on prediction information at the encoding of the first reference region, and generates the above-described secondary predicted image by means of motion compensation or disparity compensation (see step S206b), where detailed operation is similar to that explained for the corresponding video encoding apparatus.

After generating the secondary predicted image, the predicted image generation unit 207 generates a first primary predicted image based on the first reference information and a second primary predicted image based on the second reference information. Based on the first primary predicted image, the second primary predicted image, and the secondary predicted image, the predicted image generation unit 106 generates a predicted image (see step S206c), where detailed operation is similar to that explained for the corresponding video encoding apparatus.

In steps S207 to S209, processes similar to those of the corresponding steps in the operation of FIG. 5 are performed.

In the above-described second embodiment, the predicted image is generated by appropriately switching the prediction method for each block or sub-block. However, instead of the switching, weighting factor may be determined for bidirectional prediction which is executed by using both the first reference region and the second reference region.

Such a weighting factor may be determined by a method (as described above) of estimating the prediction accuracy by utilizing a prediction residual of the first reference region, prediction information of the second reference region, the third reference region, or a difference image. In another method, an optimum weight may be determined with reference to peripheral blocks of the encoding target block and peripheral blocks of the first reference region and the second reference region.

In the above-described third embodiment, the secondary predicted image is generated by referring to the third reference region which is the reference at the time of encoding the first reference region, and the generated image is utilized in the residual prediction. However, in another method, the prediction residual at the encoding of the first reference region may be stored and utilized in the residual prediction.

In this case, with given "R" which is the stored prediction residual, the above formula (1) is transformed into the following formula (2), where the predicted image can be generated from only the prediction residual of the first reference region, and the second reference region. In another method, the secondary predicted image is generated by subtracting the stored prediction residual from the image of the first reference region, and the predicted image can be generated by using the generated secondary predicted image in a manner equivalent to that employed in the third embodiment.

$$I = I_1 + R \qquad (2)$$

In the above-described first to third embodiments, the determined second reference information is utilized in the prediction of the encoding target block. However, it is possible that the determined second reference information is not used to process the encoding target block and is added to a candidate list which is utilized in the merge mode. In another example, the determined second reference information is used in the relevant prediction and is further added to the candidate list. If the second reference information is a disparity vector, it may be stored so as to use it as an NBDV. The determined second reference information may also be used as a predicted value for vector prediction or may be added to a candidate list for such vector prediction.

In the first to third embodiments, the second reference information is determined by utilizing the prediction information at the encoding of the first reference region. However, the second reference information may be determined by utilizing a candidate list or information about peripheral blocks (e.g., NBDV) at the encoding of the first reference region. One of the candidates may be selected, or a plurality of candidates may be utilized for the relevant determination.

In addition, a candidate list or information about peripheral blocks (e.g., NBDV) for the encoding target block may be utilized. Generally, the NBDV for the encoding target block is selected from a list of the disparity vectors at the encoding of peripheral blocks, based on a predetermined rule. In this process, a high likelihood disparity vector may be selected by comparing the relevant list with a disparity vector list at the encoding of peripheral blocks of the first reference region.

Also, in the first to third embodiments, one first reference information item is assigned to the encoding target block, similar to unidirectional prediction. However, as performed in generally known bidirectional prediction, two or more first reference information items may be assigned. In this case, the second reference information may be determined for both directions so as to execute the above-described operation, or the determination may be performed for only one direction.

Additionally, in the first to third embodiments, the prediction method employed when the first reference region was encoded is unidirectional prediction. However, the prediction method at the encoding of the first reference region may be bidirectional prediction. In this case, the second reference information may be determined from prediction information which indicates any one of directions for the prediction, or one second reference information item may be determined from both of the relevant prediction information items. In another manner, two second reference information items may be determined from the corresponding prediction information items. In this case, it is possible to generate individual predicted images in an operation as explained in the first to third embodiments and to generate a final predicted image by mixing the predicted images.

Furthermore, in the first to third embodiments, the first reference region which was used to determine the second reference information is used in the prediction. However, a region other than that used to determine the second reference region may be used in the prediction.

For example, two prediction information items are encoded, where one of them is utilized in the prediction while the other is utilized to determine the second reference region. In another example, encoded prediction information is used only for ordinary prediction while the first reference information utilized to determine the second reference information is separately determined by using a candidate list or an NBDV.

In addition, the second reference information may be utilized to correct or newly generate the first reference information. For example, if the first reference information is a disparity vector and a motion vector at the encoding of a reference indicated by the disparity vector is the second reference information, then a disparity vector at the encoding of a reference indicated by the second reference information is obtained. If the first reference information is a motion vector and the second reference information is obtained from a depth map of a reference indicated by the motion vector, then a motion vector at the encoding of a reference indicated by the second reference information is obtained. The obtained vector may be utilized as new first reference information in the relevant prediction.

The methods explained in the first to third embodiments may be appropriately combined with each other, or any other methods may be combined with each other.

For example, it is possible that a motion vector is obtained by using a disparity vector which has been encoded by a method explained in the first embodiment, the primary predicted image is generated by means of motion compensation prediction, and residual prediction is further performed by using the above disparity vector which has been encoded.

In another method, the residual prediction may be performed by using a disparity vector at the encoding of a reference indicated by the relevant motion vector instead of an original disparity vector which has been encoded.

In addition, the obtained motion vector may be corrected by using the encoded disparity vector and the disparity vector at the encoding of the relevant reference.

In the above examples, the disparity vector and the motion vector may be opposite to each other.

Additionally, in part of the operations in the first to third embodiments, the execution order of the steps may be modified.

As explained above, a region on a previously-encoded picture is referred to by using a motion or disparity vector which has been encoded or a motion or disparity vector obtained by utilizing a direct or merge mode, inter-view motion prediction, or any other method. For the reference region, reference information is obtained, which may be a reference picture index or a motion or disparity vector at the (time of) encoding of the reference region. Accordingly, encoding of no additional vector is necessary, and thus it is possible to perform highly accurate inter prediction, or bidirectional prediction or residual prediction which additionally utilizes an original motion or disparity vector. Therefore, the accuracy of the predicted image can be improved and thus the amount of code required for the prediction residual encoding can be reduced.

The video encoding apparatus and the video decoding apparatus shown in any above-described embodiment may be implemented by utilizing a computer. For the above implementation, a program for executing target functions may be stored in a computer readable storage medium, and the program stored in the storage medium may be loaded and executed on a computer system.

Here, the computer system has hardware resources which may include an OS and peripheral devices.

The above computer readable storage medium is a storage device, for example, a portable medium such as a flexible disk, a magneto optical disk, a ROM, or a CD-ROM, or a memory device such as a hard disk built in a computer system.

The computer readable storage medium also includes a device for temporarily storing the program, such as a communication line utilized to transmit the program via a network (e.g., the Internet) or a communication line (e.g., a telephone line), or a volatile memory in a computer system which functions as a server or client for such transmission.

In addition, the program may execute part of the above-explained functions. The program may also be a program by which the above-described functions can be executed by a combination of this program and an existing program which has already been stored in the relevant computer system. The program may also be implemented by utilizing a hardware resource such as a PLD (Programmable Logic Device) or an FPGA (Field Programmable Gate Array).

While the embodiments of the present invention have been described and shown above, it should be understood that these are exemplary embodiments of the invention and are not to be considered as limiting. Additions, omissions, substitutions, and other modifications can be made without departing from the technical concept and scope of the present invention.

INDUSTRIAL APPLICABILITY

The present invention can be applied to a case in which reduction of the amount of code required for prediction residual encoding should be implemented by performing highly accurate motion or disparity compensation prediction without encoding an additional motion or disparity vector, or highly accurately performing bidirectional prediction or residual prediction that utilizes an original motion or disparity vector, where such performance improves the accuracy of the predicted image.

REFERENCE SYMBOLS 101 encoding target video input unit
102 input video memory
103 reference picture memory
104 prediction unit
105 second reference information determination unit
106 predicted image generation unit
107 subtraction unit
108 transformation and quantization unit
109 inverse quantization and inverse transformation unit
110 addition unit
111 entropy encoding unit
112 prediction method switching unit
113 secondary predicted image generation unit
201 code data input unit
202 code data memory
203 reference picture memory
204 entropy decoding unit
205 inverse quantization and inverse transformation unit
206 second reference information determination unit
207 predicted image generation unit
208 addition unit
209 prediction method switching unit
210 secondary predicted image generation unit

The invention claimed is:

1. A video encoding apparatus that predictive-encodes an encoding target image included in an encoding target video, the apparatus comprising:

a prediction device that predicts the encoding target image with reference to a previously-encoded picture as a reference picture and determines first reference information which indicates a first reference region as a reference destination;

a second reference information determination device that determines, from reference information used when the first reference region was predictive-encoded, second reference information which indicates a second reference region as another reference destination for the encoding target image;

a prediction method determination device that determines, based on a difference between the first reference region and a third reference region referred when the first reference region was predictive-encoded, whether the first reference information is used or the first reference information and the second reference information are used to generate a predict image; and a predicted image generation device that generates the predict image using the first reference information or using the first and second reference information in accordance with a determination result by the determination device.

2. The video encoding apparatus in accordance with claim 1, wherein:

any one of the first reference information and the second reference information indicates a reference region on a reference picture in a time direction, this picture being an image obtained at a time which differs from a time at which the encoding target image was obtained, and the other indicates a reference region on a reference picture in a disparity direction, this picture being an image from a viewpoint which differs from that of the encoding target image.

3. The video encoding apparatus in accordance with claim 1, wherein:

the second reference information determination device determines the second reference information by using information which is obtained by correcting the reference information used when the first reference region was predictive-encoded.

4. The video encoding apparatus in accordance with claim 1, wherein:

the reference information used when the first reference region was predictive-encoded is a motion vector or a disparity vector.

5. The video encoding apparatus in accordance with claim 1, further comprising:

a candidate list updating device that adds the second reference information to a candidate list in which prediction information items for peripheral images of the encoding target image are listed.

6. The video encoding apparatus in accordance with claim 1, wherein the predicted image generation device that generates the predict image using the first reference information in response to a determination that the difference is larger than a predetermined threshold value and generates the predict image using the first and second reference information in response to a determination that the difference is equal or smaller than the predetermined threshold value.

7. A video decoding apparatus that predictive-decodes a decoding target image included in a decoding target video, the apparatus comprising:

a second reference information determination device, wherein from reference information used when a first reference region was predictive-decoded where the first reference region is a reference destination indicated by first reference information obtained based on encoded prediction information or information which is available in the video decoding apparatus, the second reference information determination device determines second reference information which indicates a second reference region as another reference destination for the decoding target image;

a prediction method determination device that determines, based on a difference between the first reference region and a third reference region referred when the first reference region was predictive-encoded, whether the first reference information is used or the first reference information and the second reference information are used to generate a predict image; and a predicted image generation device that generates the predict image using the first reference information or using the first and second reference information in accordance with a determination result by the prediction method determination device.

8. The video decoding apparatus in accordance with claim 7, wherein:

any one of the first reference information and the second reference information indicates a reference region on a reference picture in a time direction, this picture being an image obtained at a time which differs from a time at which the decoding target image was obtained, and the other indicates a reference region on a reference picture in a disparity direction, this picture being an image from a viewpoint which differs from that of the decoding target image.

9. The video decoding apparatus in accordance with claim 7, wherein:

the second reference information determination device determines the second reference information by using information which is obtained by correcting the reference information used when the first reference region was predictive-decoded.

10. The video decoding apparatus in accordance with claim 7, wherein:

the reference information used when the first reference region was predictive-decoded is a motion vector or a disparity vector.

11. The video decoding apparatus in accordance with claim 7, further comprising:

a candidate list updating device that adds the second reference information to a candidate list in which prediction information items for peripheral images of the decoding target image are listed.

12. A video encoding method executed by a video encoding apparatus that predictive-encodes an encoding target image included in an encoding target video, the method comprising:

a prediction step that predicts the encoding target image with reference to a previously-encoded picture as a reference picture and determines first reference information which indicates a first reference region as a reference destination;

a second reference information determination step that determines, from reference information used when the first reference region was predictive-encoded, second reference information which indicates a second reference region as another reference destination for the encoding target image;

a prediction method determination step that determines, based on a difference between the first reference region and a third reference region referred when the first reference region was predictive-encoded, whether the first reference information is used or the first reference information and the second reference information are used to generate a predict image; and a predicted image generation step that generates the predict image using the first reference information or using the first and second reference information in accordance with a determination result by the prediction method determination step.

13. The video encoding method in accordance with claim 12, further comprising:

a candidate list updating step that adds the second reference information to a candidate list in which prediction information items for peripheral images of the encoding target image are listed.

14. A video decoding method executed by a video decoding apparatus that predictive-decodes a decoding target image included in a decoding target video, the method comprising:

a second reference information determination step, wherein from reference information used when a first reference region was predictive-decoded where the first reference region is a reference destination indicated by first reference information obtained based on encoded prediction information or any information which is available in the video decoding apparatus, the second reference information determination step determines second reference information which indicates a second reference region as another reference destination for the decoding target image;

a prediction method determination step that determines, based on a difference between the first reference region and a third reference region referred when the first reference region was predictive-encoded, whether the first reference information is used or the first reference information and the second reference information are used to generate a predict image; and a predicted image generation step that generates the predict image using the first reference information or using the first and second reference information in accordance with a determination result by the prediction method determination step.

15. The video decoding method in accordance with claim 14, further comprising:

a candidate list updating step that adds the second reference information to a candidate list in which prediction information items for peripheral images of the decoding target image are listed.

* * * * *